US012398587B1

(12) United States Patent
Miller et al.

(10) Patent No.: US 12,398,587 B1
(45) Date of Patent: Aug. 26, 2025

(54) WINDOW HINGE ASSEMBLY AND METHODS

(71) Applicant: Andersen Corporation, Bayport, MN (US)

(72) Inventors: Chad Miller, Elk Mound, WI (US); Clinton Dehne, River Falls, WI (US); Craig Johnson, North Oaks, MN (US); Csaba Andrasfi, Oakdale, MN (US); Duane Fier, Hudson, WI (US); Jake Lopac, Lakeland, MN (US); Jay Brecke, Eagan, MN (US); Ross McGruder, Lake Elmo, MN (US); Paul Morris, Roseville, MN (US); Timothy Mullen, Bloomer, WI (US); Troy Peickert, Menomonie, WI (US)

(73) Assignee: Andersen Corporation, Bayport, MN (US)

( * ) Notice: Subject to any disclaimer, the term of this patent is extended or adjusted under 35 U.S.C. 154(b) by 147 days.

(21) Appl. No.: 17/954,984

(22) Filed: Sep. 28, 2022

Related U.S. Application Data

(63) Continuation of application No. 16/858,101, filed on Apr. 24, 2020, now Pat. No. 11,486,179.

(60) Provisional application No. 62/882,766, filed on Aug. 5, 2019, provisional application No. 62/878,954, filed on Jul. 26, 2019.

(51) Int. Cl.
*E05D 15/30* (2006.01)
*E05D 7/04* (2006.01)

(52) U.S. Cl.
CPC ............... *E05D 15/30* (2013.01); *E05D 7/04* (2013.01); *E05Y 2900/148* (2013.01)

(58) Field of Classification Search
CPC ...... E05D 15/30; E05D 7/04; E05Y 2900/148
See application file for complete search history.

(56) References Cited

U.S. PATENT DOCUMENTS

| | | | | | |
|---|---|---|---|---|---|
| 1,422,552 | A | | 7/1922 | Fournier | |
| 4,790,106 | A | * | 12/1988 | La See | E05D 15/30 49/252 |
| 5,040,267 | A | * | 8/1991 | Dallmann | E05D 15/30 16/361 |
| 5,491,930 | A | | 2/1996 | La See | |
| 5,509,177 | A | * | 4/1996 | Hindin | E05D 15/466 16/370 |
| 5,711,052 | A | * | 1/1998 | Delaske | E05D 15/30 16/245 |
| 5,839,229 | A | | 11/1998 | Briggs | |
| 6,112,371 | A | * | 9/2000 | Tremblay | E05D 15/30 16/DIG. 34 |

(Continued)

*Primary Examiner* — Jason W San
*Assistant Examiner* — Matthew J Sullivan
(74) *Attorney, Agent, or Firm* — Mueting Raasch Group

(57) ABSTRACT

Window hinge assemblies including a hinge pin support and methods of using the same are described herein. The hinge assemblies include a track assembly, a shoe slidably engaged in a track of the track assembly, a sash arm configured for attachment to a rotating sash, the sash arm being pivotally attached to the shoe, and a connecting arm. The track assembly includes a base extending along a track axis, a shoe track extending along the track axis, a hinge pin attached to the base of the track assembly, and a hinge pin support restraining an upper end of the hinge pin from movement relative to the base.

15 Claims, 17 Drawing Sheets

(56) References Cited

U.S. PATENT DOCUMENTS

| | | | | |
|---|---|---|---|---|
| 6,134,751 | A | 10/2000 | Carrier | |
| 6,643,896 | B2 | 11/2003 | Carrier | |
| 7,735,194 | B2 | 6/2010 | Bruzek | |
| 8,468,656 | B2 * | 6/2013 | Bauman | E05D 15/30 16/199 |
| 10,072,450 | B2 * | 9/2018 | Lambertini | E05D 7/0415 |
| 10,550,618 | B2 * | 2/2020 | Zhou | E05D 11/0018 |
| 2007/0101653 | A1 * | 5/2007 | Bruzek | E05F 7/005 49/246 |
| 2007/0289100 | A1 * | 12/2007 | Lake | E05F 11/16 16/362 |
| 2008/0000159 | A1 * | 1/2008 | Gilbert | E05D 15/30 49/345 |
| 2009/0044377 | A1 * | 2/2009 | Liang | E05D 7/0415 16/354 |
| 2009/0077897 | A1 * | 3/2009 | Liang | E05D 7/0423 49/397 |
| 2018/0023329 | A1 * | 1/2018 | Lambertini | E05D 7/0054 16/239 |
| 2018/0112448 | A1 * | 4/2018 | Warren | E05D 15/30 |
| 2018/0320429 | A1 * | 11/2018 | Zhou | E05D 11/0018 |
| 2019/0383069 | A1 * | 12/2019 | Guelck | E05C 17/24 |
| 2020/0071976 | A1 * | 3/2020 | Zhou | E05D 15/32 |
| 2020/0149333 | A1 * | 5/2020 | Stoepker | E05D 15/101 |

* cited by examiner

WINDOW HINGE ASSEMBLY AND METHODS

RELATED APPLICATONS

This is a continuation application of U.S. patent application Ser. No. 16/858,101, filed Apr. 24, 2020, which claims the benefit of U.S. Provisional Application No. 62/878,954 entitled "WINDOW HINGE ASSEMBLY AND METHODS" and filed on Jul. 26, 2019 and also claims the benefit of U.S. Provisional Patent Application Ser. No. 62/882,766 entitled "IMPROVED WINDOW HINGE ASSEMBLY AND METHODS" and filed on Aug. 5, 2019, both of which are incorporated herein by reference in their entireties.

Window hinge assemblies including a hinge pin support and methods of using the same are described herein.

BACKGROUND

Casement windows include a frame mounted in a rough opening provided in a structure, with at least one sash mounted for rotation within the window frame, the sash being movable between open and closed positions within the window frame.

The sashes in such windows are mounted on hinge assemblies to allow for rotation of the sash within the window frame. Those hinge assemblies may include a track attached to the window frame and a sash arm attached to the sash. One end of the sash arm is attached to a shoe that slides along the track, with the sash arm being pivotally attached to the shoe. The hinge assembly further includes a connecting arm pivotally attached to both the track and the sash arm. As the sash rotates from a closed position to an open position, the shoe slides along the track while the connecting arm rotates around a hinge pin positioned in the window frame. Some examples of such known hinge assemblies for casement windows may be found in, for example, U.S. Pat. Nos. 5,491,930; 6,112,371; 6,134,751; 6,643,896; 7,735,194; and 8,468,656.

SUMMARY

Window hinge assemblies including a hinge pin support and methods of using the same are described herein. In one or more embodiments, the hinge assemblies include a track assembly, a shoe slidably engaged in a track of the track assembly, a sash arm configured for attachment to a rotating sash, the sash arm being pivotally attached to the shoe, and a connecting arm. The track assembly includes a base extending along a track axis, a shoe track extending along the track axis, a hinge pin attached to the base of the track assembly, and a hinge pin support restraining an upper end of the hinge pin from movement relative to the base.

One potential advantage of one or more embodiments of hinge assemblies as described herein is that restraining the upper end of the hinge pin in addition to supporting the base end of the hinge pin (where the hinge pin attaches to the base of the track assembly) can reduce the likelihood of damage to the hinge pin when the sash attached in the window frame is in a closed position. When the sash is in, for example, a closed position, forces acting on the window frame and directed along the track axis can be transmitted to the hinge pin through the connecting arm and the sash arm. Those forces can damage hinge pins that are supported only at their base end (where the hinge pins are attached only to the base of the track assembly-essentially resulting in a hinge pin cantilevered above the base of the track assembly).

Restraining the upper end of the hinge pin in addition to supporting its base end with the sash in the closed position reduces the likelihood of damage to the hinge pin when, for example, the window unit is subjected to drops and other types of full window/sash impacts during transportation of the window unit from the assembly factory to the building rough opening into which it is installed. Restraining the upper end of the hinge pin in addition to supporting its base end can also reduce the likelihood of damage to a hinge pin when the sash is in an open position and subject to forces from, for example, wind gusts, which may be transmitted through the hinge assembly to the hinge pin, thereby damaging the hinge pin.

Supporting the hinge pin at both its base end and its upper end distributes forces transmitted to the hinge pin through the connecting arm and can, in many instances, prevent or at least substantially reduce the likelihood of hinge pin damage.

In a first aspect, one or more embodiments of a hinge assembly for supporting a rotating sash in a window frame as described herein may include: a track assembly configured for attachment to a window frame, the track assembly comprising a base, a shoe track, a hinge pin, and a hinge pin support, wherein the base extends along a track axis from a hinge pin end to a shoe track end, wherein the shoe track extends along the track axis, and wherein the shoe track extends from the shoe track end towards the hinge pin end, wherein the hinge pin comprises a base end connected to the base proximate the hinge pin end of the base, the hinge pin comprising an upper end distal from the base, wherein the hinge pin support extends above the base such that a portion of the hinge pin is exposed between the base and the hinge pin support, wherein the hinge pin support restrains the upper end of the hinge pin from movement relative to the base. The hinge assembly may further include a shoe slidably engaged with the shoe track, wherein the shoe is configured to slide along the shoe track end the shoe is restrained from moving transverse to the track axis when the shoe is slidably engaged with the shoe track; a sash arm configured for attachment to a rotating sash, the sash arm extending from a shoe end to a distal end, wherein the shoe end is pivotally coupled to the shoe; and a connecting arm extending from a hinge pin end to a sash end, wherein the sash end is pivotally connected to the sash arm at an intermediate location spaced from the shoe end of the sash arm, and wherein the hinge pin end of the connecting arm is pivotally connected to the hinge pin for rotation about a pin axis extending through the upper end of the hinge pin, wherein the hinge pin end of the connecting arm is located between the hinge pin support and the base of the track assembly.

In one or more embodiments of the hinge assemblies described herein, the hinge pin support comprises a hinge pin bore, wherein a portion of the hinge pin is located in the hinge pin bore such that movement of the hinge pin relative to the hinge pin support is restricted.

In one or more embodiments of the hinge assemblies described herein, the hinge pin support comprises a hinge pin support tab formed integrally with the base, wherein the hinge pin support tab and the base define a U-shaped structure comprising a bottom from which two legs extend, wherein the hinge pin extends between the legs of the U-shaped structure distal from the bottom of the U-shaped structure.

In one or more embodiments of the hinge assemblies described herein, the hinge pin support comprises a hinge pin support bracket separate and discrete from the base of the track assembly, wherein at least a portion of the hinge pin support bracket is positioned over the base such that the hinge pin extends between the base and the hinge pin support bracket. In one or more embodiments, the hinge pin support bracket and the base of the track assembly comprise interlocking mechanical features configured to transfer mechanical loads directed along the track axis on the hinge pin to the base and the hinge support bracket.

In one or more embodiments of the hinge assemblies including a hinge pin support bracket as described herein, the hinge pin support bracket is secured relative to the base by a mechanical fastener. In one or more embodiments, the base comprises a base fastener aperture and wherein the hinge pin support bracket comprises a bracket fastener aperture, wherein the base fastener aperture is aligned with the bracket fastener aperture when the hinge pin support bracket is secured relative to the base by the mechanical fastener. In one or more embodiments, the hinge pin support bracket and the base of the track assembly comprise interlocking mechanical features configured to transfer mechanical loads directed along the track axis on the hinge pin to the base and the hinge pin support bracket when the hinge pin support bracket is secured relative to the base by the mechanical fastener.

In one or more embodiments of the hinge assemblies including a hinge pin support bracket and base including interlocking mechanical features as described herein, the interlocking mechanical features are located proximate the base fastener opening and the bracket fastener opening.

In one or more embodiments of the hinge assemblies including a hinge pin support bracket and base including interlocking mechanical features as described herein, the interlocking mechanical features are positioned around a perimeter of the base fastener opening and around a perimeter of the bracket fastener opening.

In one or more embodiments of the hinge assemblies including a hinge pin support bracket as described herein, the bracket fastener opening comprises an elongated non-circular opening such that a position of the hinge pin bracket relative to the base is adjustable along the track axis.

In one or more embodiments of the hinge assemblies including a hinge pin support bracket as described herein, the hinge pin support bracket further comprises a vent limiter configured to limit rotation of the connecting arm around the hinge pin when the hinge assembly is moving from a closed configuration to an open configuration. In one or more embodiments, the hinge pin support bracket and the vent limiter each comprise separate and discrete articles attached to each other. In one or more embodiments, the hinge pin support bracket and the vent limiter are attached to each other using one or more mechanical fasteners.

In one or more embodiments of the hinge assemblies described herein, the hinge assembly further comprises a bushing in the hinge pin bore, wherein the hinge pin comprises a pin portion located in a bushing aperture of the bushing, wherein the bushing aperture and the pin portion of the hinge pin are positioned off-center in the hinge pin bore such that rotation of the hinge pin about a stud axis extending through a center of the hinge pin bore rotates the bushing in the hinge pin bore and moves the pin portion of the hinge pin towards or away from the shoe track. In one or more embodiments, the bushing and the hinge pin bracket comprise visible indicia indicative of the rotational position of the bushing in the hinge pin bore. In one or more embodiments, the relative rotational position of the bushing is indicative of the position of the pin portion of the hinge pin along the track axis relative to the shoe track.

In a second aspect, one or more embodiments of a hinge assembly for supporting a rotating sash in a window frame as described herein may include: a track assembly configured for attachment to a window frame, the track assembly comprising a base, a shoe track, a hinge pin, and a hinge pin support, wherein the base extends along a track axis from a hinge pin end to a shoe track end, wherein the shoe track extends along the track axis, and wherein the shoe track extends from the shoe track end towards the hinge pin end, wherein the hinge pin comprises a base end connected to the base proximate the hinge pin end of the base, the hinge pin comprising an upper end distal from the base, wherein the hinge pin support comprises a hinge pin support bracket separate and discrete from the base of the track assembly, wherein the hinge pin support bracket comprises a support portion extending above the base, the support portion comprising a hinge pin bore, wherein a portion of the hinge pin is exposed and extends between the base and the hinge pin bore of the support portion of the hinge pin support, wherein the hinge pin support restrains the upper end of the hinge pin from movement relative to the base, and wherein the hinge pin support bracket and the base of the track assembly comprise interlocking mechanical features configured to transfer mechanical loads directed along the track axis on the hinge pin to the base and the hinge pin support bracket when the hinge pin support bracket is secured relative to the base. The hinge assemblies may further include a shoe slidably engaged with the shoe track, wherein the shoe is configured to slide along the shoe track end the shoe is restrained from moving transverse to the track axis when the shoe is slidably engaged with the shoe track; a sash arm configured for attachment to a rotating sash, the sash arm extending from a shoe end to a distal end, wherein the shoe end is pivotally coupled to the shoe; and a connecting arm extending from a hinge pin end to a sash end, wherein the sash end is pivotally connected to the sash arm at an intermediate location spaced from the shoe end of the sash arm, and wherein the hinge pin end of the connecting arm is pivotally connected to the hinge pin for rotation about a pin axis extending through the upper end of the hinge pin, wherein the hinge pin end of the connecting arm is located between the hinge pin support and the base of the track assembly. In one or more embodiments, the hinge pin support bracket further comprises a vent limiter configured to limit rotation of the connecting arm around the hinge pin when the hinge assembly is moving from a closed configuration to an open configuration.

In a third aspect, one or more embodiments of a hinge assembly for supporting a rotating sash in a window frame as described herein includes: a track assembly configured for attachment to a window frame, the track assembly comprising a base, a shoe track, a hinge pin, a hinge pin support bracket, and a bracket clip, wherein the base extends along a track axis from a hinge pin end to a shoe track end, wherein the shoe track extends along the track axis, and wherein the shoe track extends from the shoe track end towards the hinge pin end, wherein the hinge pin comprises a base end connected to the base proximate the hinge pin end of the base, the hinge pin comprising an upper end distal from the base, wherein the hinge pin support bracket is separate and discrete from the base of the track assembly, wherein the hinge pin support bracket comprises a support portion extending above the base and a base portion located above the base of the track assembly, wherein the support portion of the hinge pin support bracket comprises a hinge pin bore, wherein a portion of the hinge pin is exposed and extends between the base and the hinge pin bore of the support portion of the hinge pin support bracket, wherein the bracket clip is positioned above the base portion of the of the hinge pin support bracket such that the base portion of the hinge pin support bracket is located between the bracket clip and the base of the track assembly, wherein the hinge pin support bracket and the bracket clip are configured to restrain the upper end of the hinge pin from movement relative to the base, wherein the bracket clip, the base portion of the hinge pin support bracket and the base of the track assembly comprise interlocking mechanical features configured to transfer at least a portion of any mechanical loads directed along the track axis on the hinge pin to the base through the hinge pin support bracket and the bracket clip when the hinge pin support bracket and the bracket clip are secured relative to the base and the upper end of the hinge pin is located in the hinge pin bore of the support portion of the hinge pin support bracket. The hinge assembly further includes a shoe slidably engaged with the shoe track, wherein the shoe is configured to slide along the shoe track end the shoe is restrained from moving transverse to the track axis when the shoe is slidably engaged with the shoe track; a sash arm configured for attachment to a rotating sash, the sash arm extending from a shoe end to a distal end, wherein the shoe end is pivotally coupled to the shoe; and a connecting arm extending from a hinge pin end to a sash end, wherein the sash end is pivotally connected to the sash arm at an intermediate location spaced from the shoe end of the sash arm, and wherein the hinge pin end of the connecting arm is pivotally connected to the hinge pin for rotation about a pin axis extending through the upper end of the hinge pin, wherein the hinge pin end of the connecting arm is located between the support portion of the hinge pin support bracket and the base of the track assembly.

In a fourth aspect, one or more embodiments of a hinge assembly for supporting a rotating sash in a window frame as described herein may include: a track assembly configured for attachment to a window frame, the track assembly comprising a base, a shoe track, a hinge pin, and a hinge pin support, wherein the base extends along a track axis from a hinge pin end to a shoe track end, wherein the shoe track extends along the track axis, and wherein the shoe track extends from the shoe track end towards the hinge pin end, wherein the hinge pin comprises a base end connected to the base proximate the hinge pin end of the base, the hinge pin comprising an upper end distal from the base, wherein the hinge pin support extends above the base such that a portion of the hinge pin is exposed between the base and the hinge pin support, wherein the hinge pin support restrains the upper end of the hinge pin from movement relative to the base, wherein the hinge pin support comprises a hinge pin bore, wherein a portion of the hinge pin is located in the hinge pin bore such that movement of the hinge pin relative to the hinge pin support is restricted, and wherein the hinge pin support comprises a hinge pin support tab formed integrally with the base, the hinge pin bore being located in the hinge pin support tab, wherein the hinge pin support tab and the base define a U-shaped structure comprising a bottom from which two legs extend, wherein the hinge pin extends between the legs of the U-shaped structure distal from the bottom of the U-shaped structure. The hinge assemblies may further include a shoe slidably engaged with the shoe track, wherein the shoe is configured to slide along the shoe track end the shoe is restrained from moving transverse to the track axis when the shoe is slidably engaged with the shoe track; a sash arm configured for attachment to a rotating sash, the sash arm extending from a shoe end to a distal end, wherein the shoe end is pivotally coupled to the shoe; and a connecting arm extending from a hinge pin end to a sash end, wherein the sash end is pivotally connected to the sash arm at an intermediate location spaced from the shoe end of the sash arm, and wherein the hinge pin end of the connecting arm is pivotally connected to the hinge pin for rotation about a pin axis extending through the upper end of the hinge pin, wherein the hinge pin end of the connecting arm is located between the hinge pin support and the base of the track assembly.

As used herein and in the appended claims, the singular forms "a," "an," and "the" include plural referents unless the context clearly dictates otherwise. Thus, for example, reference to "a" or "the" component may include one or more of the components and equivalents thereof known to those skilled in the art. Further, the term "and/or" means one or all of the listed elements or a combination of any two or more of the listed elements.

It is noted that the term "comprises" and variations thereof do not have a limiting meaning where these terms appear in the accompanying description. Moreover, "a," "an," "the," "at least one," and "one or more" are used interchangeably herein.

The above summary is not intended to describe each embodiment or every implementation of the hinge assemblies and methods of using the same as described herein. Rather, a more complete understanding of the invention will become apparent and appreciated by reference to the following Description of Illustrative Embodiments and claims in view of the accompanying figures of the drawing.

DESCRIPTION OF ILLUSTRATIVE EMBODIMENTS

Figure 1:
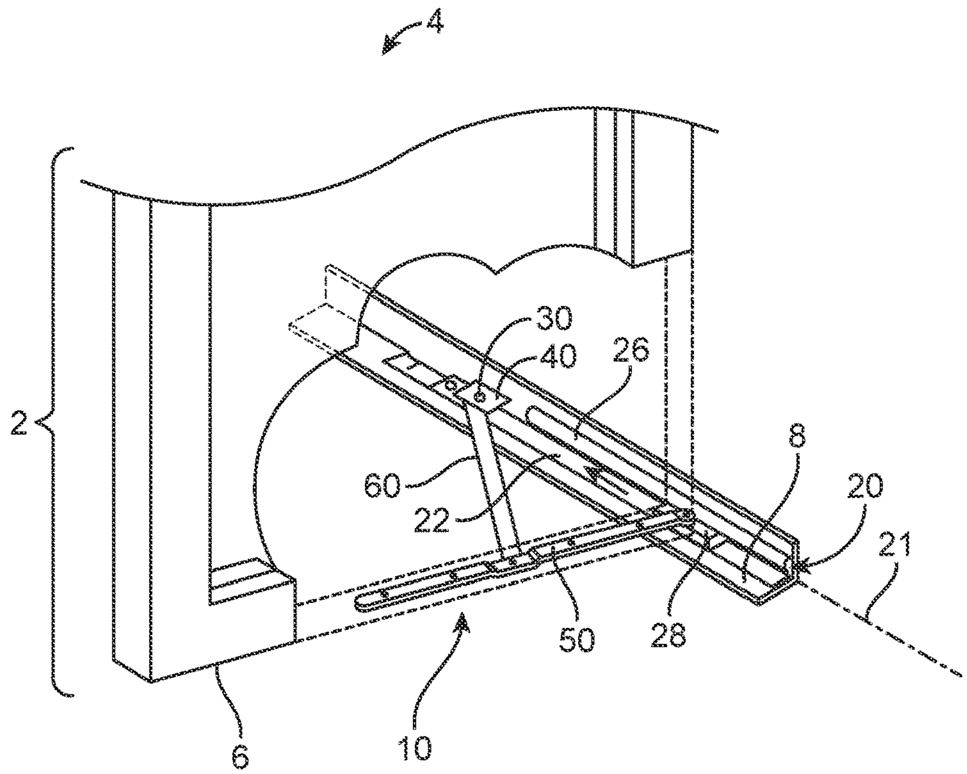
FIG. 1 is a perspective view of one illustrative embodiment of a hinged window incorporating one illustrative embodiment of a hinge assembly as described herein (portions of the sash being removed to facilitate viewing of the hinge assembly and the window frame).

In the following description of illustrative embodiments, reference is made to the accompanying figures of the drawing which form a part hereof, and in which are shown, by way of illustration, specific embodiments. It is to be understood that other embodiments may be utilized and structural changes may be made without departing from the scope of the present invention.

The hinge assemblies described herein may be used with windows having one or more rotating sashes in a window frame, with each rotating sash being supported by at least one hinge assembly to control rotation of the sash relative to the frame. Some examples of windows with which the hinge assemblies described herein may be used include casement windows, awning windows, French casement windows, hopper windows, tilt-turn windows, pivot windows, utility windows, etc.

One illustrative embodiment of a portion of a casement window is depicted in the perspective view of FIG. 1. The casement window 2 includes a rotating sash 4 mounted in a frame including a frame member 8. The rotating sash 4 is supported at its bottom end by a hinge assembly 10, with the hinge assembly 10 being attached to a frame member 8 of the window frame in which the rotating sash 4 is located. Although not depicted, it will be understood that the sash 4 is also typically supported at its top end by a second hinge assembly.

Figure 2A:
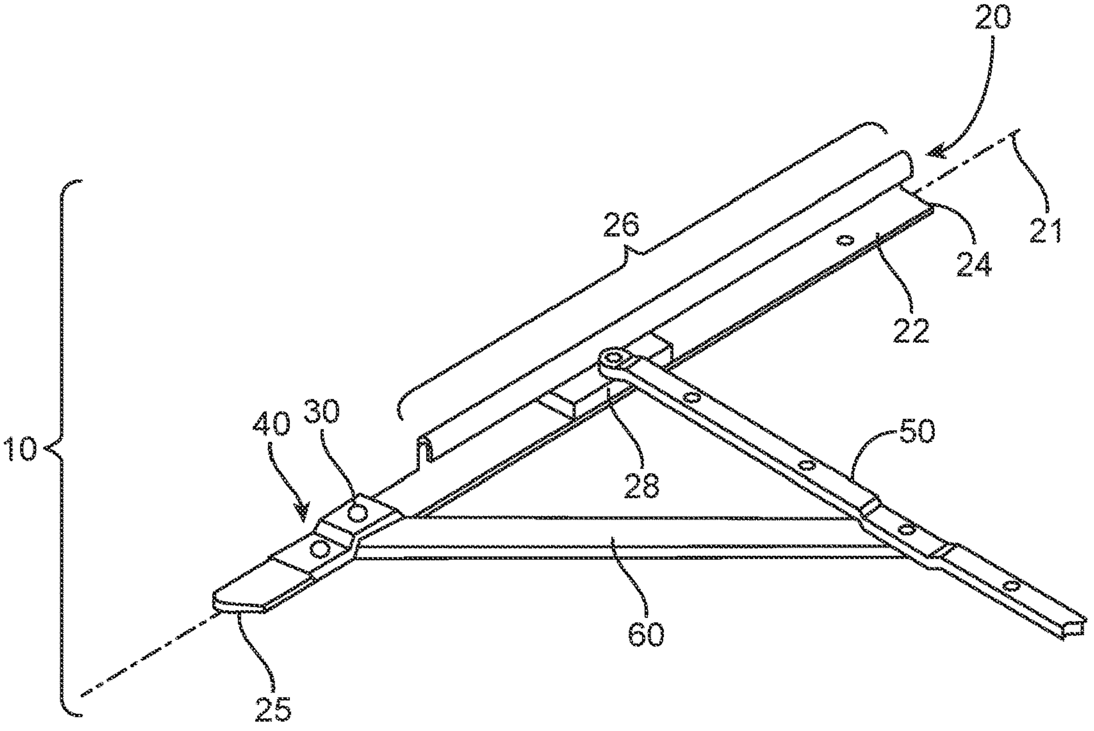
FIG. 2A is a perspective view depicting the hinge assembly of FIG. 1 in isolation from the window frame and sash depicted in FIG. 1.

The hinge assembly 10, which is isolated or removed from the sash 4 and window frame member 8 in FIG. 2A, includes a track assembly 20, sash arm 50, and connecting arm 60. The hinge assembly 10 is, in many respects, similar to typical hinge assemblies used to support rotating sashes in casement windows. For example, the track assembly 20 includes a base 22 and a shoe track 26, with shoe 28 being slidably engaged with the shoe track 26 as known in conventional casement window hinge assemblies.

The base 22 of track assembly 20 includes a shoe track end 24 and a hinge pin end 25, with the base 22 extending between the shoe track end 24 and the hinge pin end 25 along track axis 21. The shoe track 26 is also aligned with and extends along the track axis 21, with the shoe track 26 extending from the shoe track end 24 of the base 22 towards the hinge pin end 25 of the base 22. Typically, the shoe track 26 will not extend along the base 22 to the hinge pin end 25 and may, therefore, be described as occupying only a portion of the base 22 of the track assembly 20.

Sash arm 50 is, in the depicted illustrative embodiment, attached to the bottom 6 of the sash 4 and pivotally connected to the shoe 28 to both support and control movement of the sash relative to the window frame (e.g., window frame member 8) during opening and closing of the sash 4. Connecting arm 60 is pivotally connected to both the sash arm 50 and a hinge pin 30 of the track assembly 20 to further control movement of the sash arm 50 and, therefore, sash 4 relative to the window frame (e.g., window frame member 8) as the sash 4 is opened and closed.

In one or more embodiments, the connecting arm 60 may be described as extending from a hinge pin end pivotally connected to the hinge pin 30 and a sash end pivotally connected to the sash arm 50. The sash end of the connecting arm 60 is pivotally connected to the sash arm 50 at an intermediate location spaced from the shoe end of the sash arm 50.

The pivotal connection between sash arm 50 and the shoe 28 along with the pivotal connections of the connecting arm 60 to both the hinge pin 30 and the sash arm 50 allow sash 4 to rotate as the sash is opened and closed, with the shoe 28 sliding along shoe track 26 during opening and closing of the sash 4. As also known in conventional hinge assemblies used in casement windows, the shoe 28 engages the shoe track 26 such that the shoe 28 is restrained from moving transverse to the track axis 21 defined by the base 22 of the track assembly 20 as the shoe 28 slides along shoe track 26.

Figure 2B:
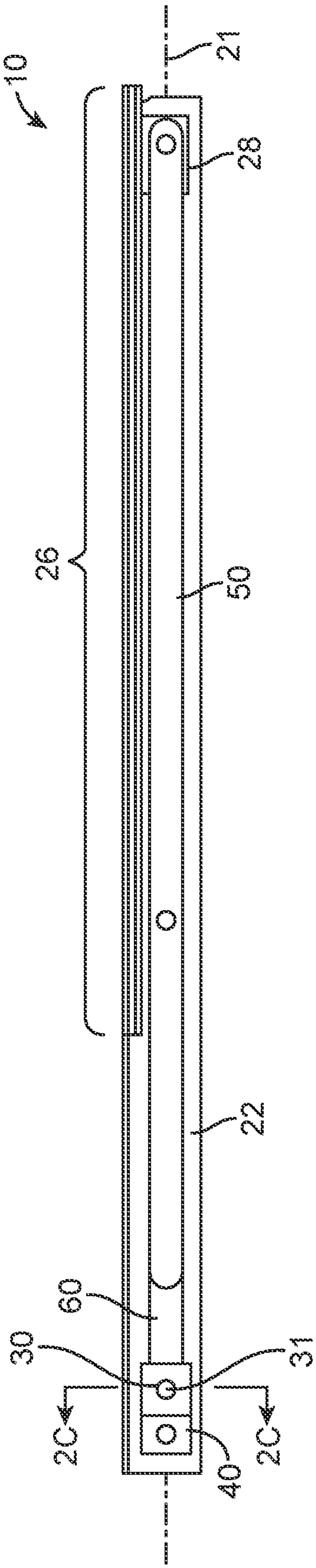
FIG. 2B is a top view of the components of the hinge assembly of FIG. 2A with the sash in the closed position such that the sash arm 50 and connecting arm 60 are aligned along the track axis 21.

The hinge assembly 10 as depicted in FIG. 2A is in an open configuration in which the sash connected to the sash arm 50 is in an open position relative to a window frame. FIG. 2B depicts the components of the hinge assembly 10 of FIG. 2A as arranged when a sash connected to the hinge assembly 10 is in a closed configuration relative to a window frame. As depicted in FIG. 2B, the sash arm 50 and connecting arm are rotated relative to their positions in FIG. 2A such that the sash arm 50 and connecting arm 60 are generally aligned with the track axis 21 when the hinge assembly is in the closed configuration.

Figure 2C:
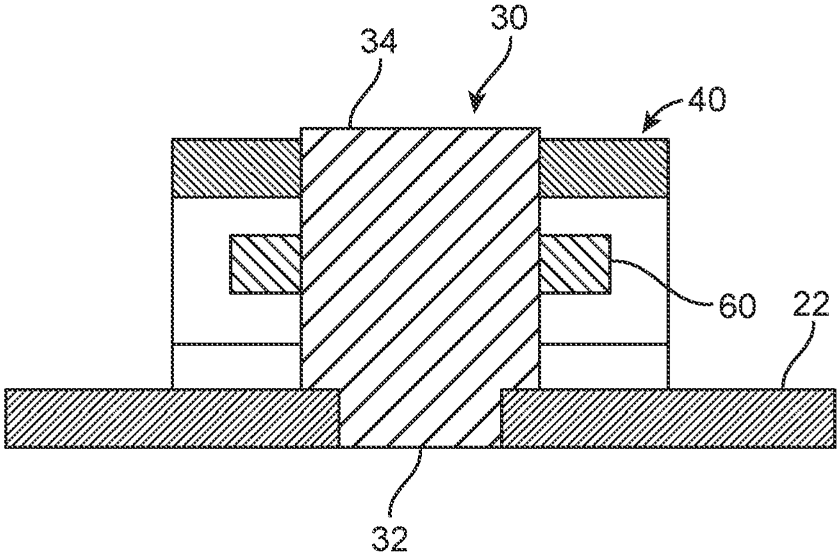
FIG. 2C is an enlarged cross-sectional view of the hinge assembly of FIG. 2B taken along line 2C-2C in FIG. 2B.

As noted above, the connecting arm 60 is pivotally connected to both the sash arm 50 and the hinge pin 30. As in conventional hinge assemblies used with, for example, casement windows, the track assembly 20 includes a hinge pin 30 attached to the base 22 of the track assembly 20, with the connecting arm 60 being pivotally connected to the hinge pin 30 for rotation about the hinge pin 30. With reference to FIG. 2C, in one or more (but not all) embodiments, the hinge pin 30 includes a stud or base portion extending through the base 22 of the track assembly to a base end 32, with the reminder of the hinge pin 30 extending away from the base 22 of the track assembly 20 to the upper end 34 of the hinge pin 30 located distal from the base 22.

Unlike conventional hinge assemblies, the illustrative embodiment of end assembly 10 depicted in FIG. 2A includes a hinge pin support that, in the depicted illustrative embodiment, is in the form of a separate and discrete hinge pin support bracket 40. The hinge pin support bracket 40 extends above the base 22 of the track assembly to support and restrain the upper end 34 (see, e.g., FIG. 2C) of the hinge pin 30 from movement relative to the base 22 of the track assembly 20. The hinge pin support bracket 40 is only one example of the structures that may be used to restrain the upper end 34 of the hinge pin 30 from movement relative to the base 22 of a track assembly 20.

Also, with reference to FIG. 2C, the hinge pin end of the connecting arm 60 is located between the hinge pin support bracket 40 and the base 22 of the track assembly 20. As a result, forces exerted on the hinge pin 30 by connecting arm 60 are distributed over a base portion of hinge pin 30 proximate the base end 32 and an upper portion of hinge pin 30 proximate the upper end 34, rather than being concentrated over the base portion of the hinge pin 30 as would happen where the upper portion of the hinge pin 30 proximate the upper end 34 was not restrained by the hinge pin support bracket 40.

Figure 3:
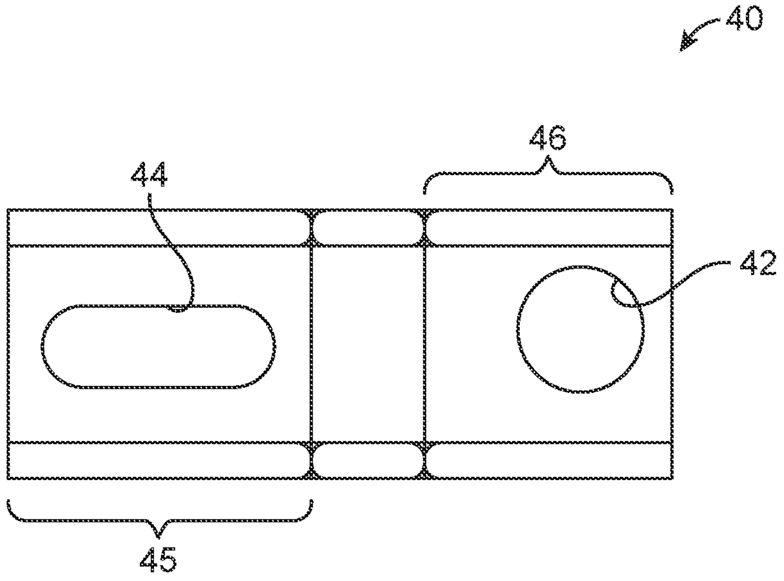
FIG. 3 is a top view of the illustrative embodiment of a hinge pin support bracket as depicted in FIGS. 1-2.
Figure 4:
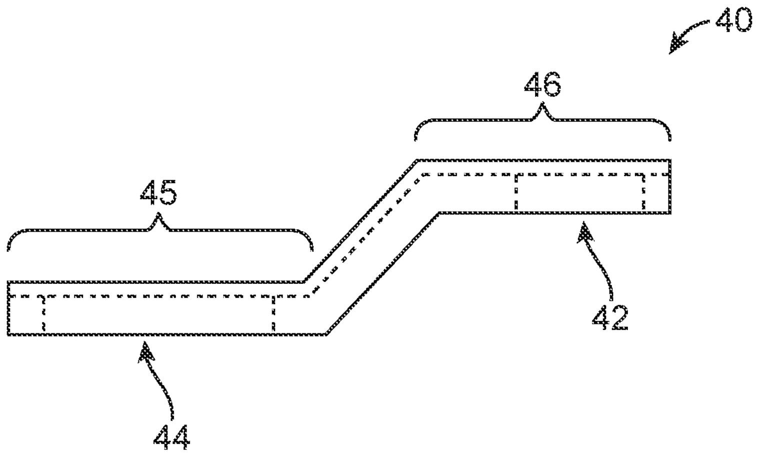
FIG. 4 is a side elevation view of the hinge pin support bracket of FIG. 3.

The illustrative embodiment of hinge pin support bracket 40 is depicted in isolation in FIGS. 3-4. FIG. 3, a top view of the hinge pin support bracket 40 depicts the hinge pin bore 42 in which the upper portion of the hinge pin 30 (i.e., the portion of the hinge pin 30 proximate the upper end 34). The hinge pin support bracket 40 also includes a fastener opening 44 through which one or more mechanical fasteners may pass to attach the hinge pin support bracket 40 to the base 22 of the track assembly 20 and/or the window frame.

Positioning of the hinge pin 30 in the hinge pin bore 42 provides the restraint of the hinge pin 30 relative to the base 22 because the hinge pin support bracket 40 is connected to the base 22 of the track assembly 20 (although, in some alternative embodiments, the hinge pin support bracket 40 may be attached directly to the frame member of a window frame to which the track assembly 20 is, itself, attached).

In one or more embodiments, the hinge pin support bracket may be described as having a base portion 45 and a support portion 46, with the base portion 45 being used to attach the hinge pin support bracket 40 to the base 22 of a track assembly and/or a window frame and the support portion 46 including the hinge pin bore 42 to restrain the upper portion of a hinge pin 30 located therein. In one or more embodiments, the support portion 46 may be described as being cantilevered over the hinge pin 30 supported by the hinge pin support bracket 40 to provide a gap between the support portion 46 and the base 22, with the connecting arm 60 being positioned about the hinge pin 30 in the gap provided between the hinge pin support bracket 40 and the base 22 of the track assembly 20.

Another optional feature that may be provided in one or more embodiments of a hinge pin support bracket used in a hinge assembly as described herein can be discussed with reference to FIGS. 5A-5B and 6A-6B in which a portion of the base 22 proximate the hinge pin end 25 of the base 22 is depicted.

Figure 5A:
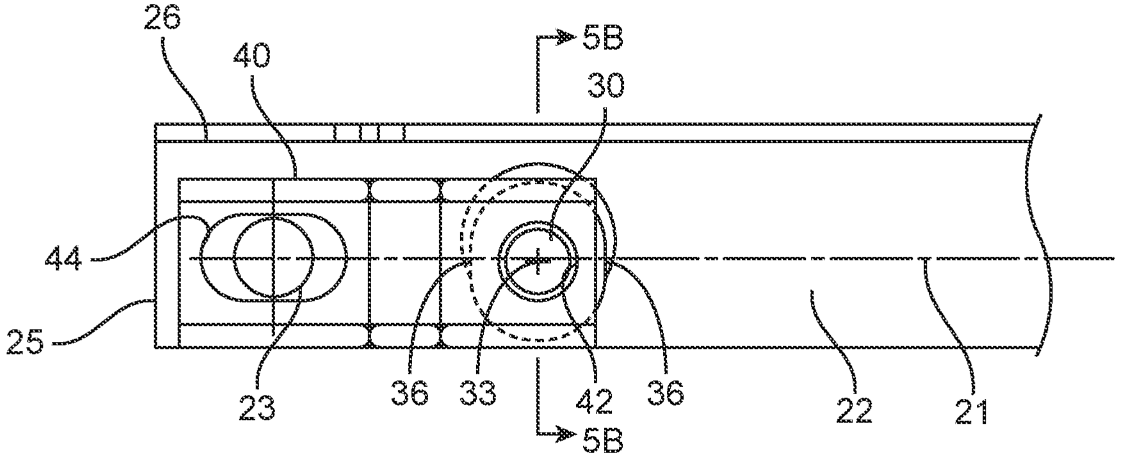
FIG. 5A is an enlarged top view of the hinge pin support bracket located on the base of the track assembly.
Figure 5B:
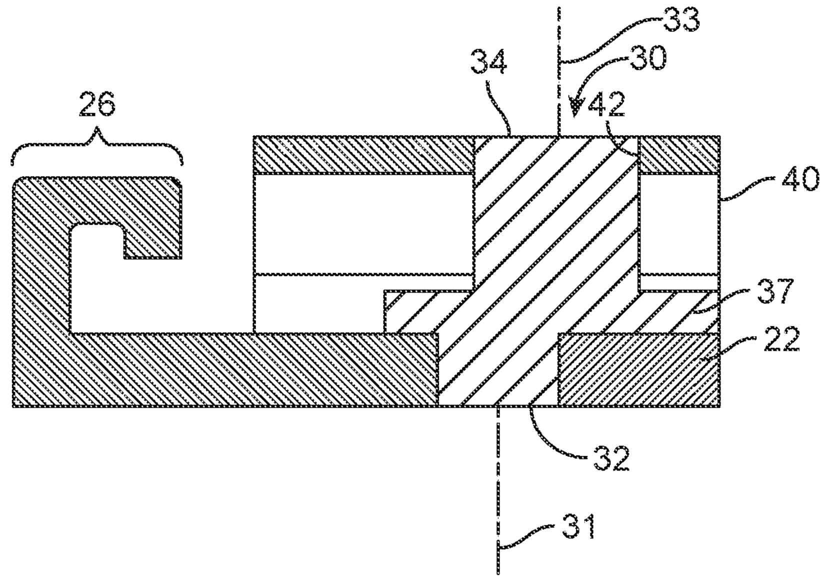
FIG. 5B is a cross-sectional view of FIG. 5A taken along line 5B-5B in FIG. 5A.

As seen in FIGS. 5A-5B, the support bracket 40 may be described as being aligned with the track axis 21 defined along base 22, with the hinge pin 30 extending from the base 22 into the hinge pin bore 42 in hinge pin support bracket 40. When so positioned, the bracket fastener opening 44 provided in the hinge pin support bracket 40 is aligned with a fastener opening 23 in the base 22 of the track assembly 20. Inserting a fastener through bracket fastener opening 44 and fastener opening 23 in base 22 would secure the hinge pin support bracket 40 and allow the hinge pin support bracket 42 restrain the upper portion of the hinge pin 30 as described herein.

In many embodiments of hinge assemblies used with, for example, casement windows, the hinge pin 30 may be eccentrically shaped or mounted such that rotation of the hinge pin about its hinge pin axis (see, for example, axis 31 of hinge pin 30 in FIG. 2C) moves the position of the hinge pin relative to the base of a track assembly to allow for field adjustment of the hinge assembly as needed. In the depicted embodiment, hinge pin 30 includes wrench flats 36 that may be used to rotate the hinge pin 30 as needed.

Figure 6A:
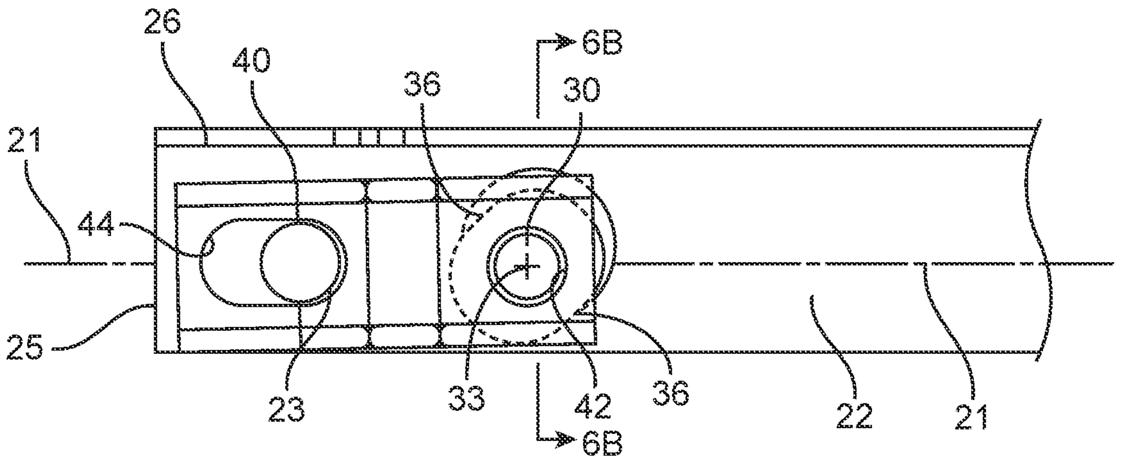
FIG. 6A is a view of the hinge pin support bracket of FIG. 5A after rotation of the hinge pin relative to the track and depicting corresponding movement of the hinge pin bracket.
Figure 6B:
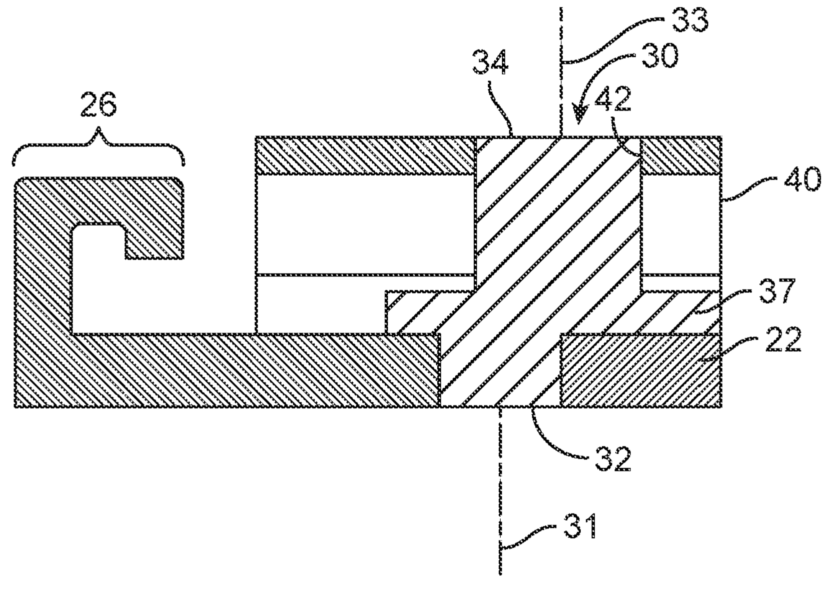
FIG. 6B is a cross-sectional view of FIG. 6A taken along line 6B-6B in FIG. 6A.

The eccentric design of one or more (but not all) embodiments of hinge pins used in hinge assemblies as described herein may be seen, for example, in the cross-sectional view the illustrative embodiment of hinge pin 30 of FIGS. 5B and 6B. In the depicted illustrative embodiment, the stud or base portion of the hinge pin 30 extends through base 22 of the track assembly 20 to the base end 32 and defines a stud axis 31 around which the hinge pin 30 can be rotated if desired.

The rotational position of the stud or base portion of the hinge pin 30 relative to hinge pin axis 31 may, in one or more embodiments, be retained by friction between the stud or base portion of the hinge pin 30 and the base 22 of the track assembly. In one or more embodiments, the portion of the base 22 of the track assembly surrounding the opening through which the hinge pin 30 extends may be textured or otherwise treated to increase frictional engagement between the base 22 and the hinge pin 32 reduce the likelihood of unwanted rotation of the hinge pin 30 relative to the base 22. For example, if the hinge pin is deformed to form a swedge (as is common in conventional hinge pins), the portion of the base surrounding the opening through which the hinge pin extends and which would be in contact with the swedge may be textured, roughened, etc. to increase friction between the swedge of the hinge pin and the base 22. Increasing friction between the hinge pin and the base of the track assembly may be useful to, for example, limit unwanted pin rotation (sometimes referred to as pin migration) if the sash is subjected to buffeting due to wind or other repetitive forces. Other techniques of fixing the rotational position of the hinge pins used in hinge assemblies as described herein may be used in place of, or in addition to, friction.

The pin portion of the hinge pin 30, i.e., the portion of the hinge pin 30 located above the base 22 of the track assembly 20 defines a pin axis 33 that is offset from the stud axis 31, i.e., the stud axis 31 and the pin axis 33 are generally aligned with each other, but are offset from each other in a plane defined by the track axis 21 and one or both of the stud axis 31 and the pin axis 33 (e.g., the top of the base 22 in the depicted illustrative embodiment).

The connecting arm 60 is attached to the pin portion of the hinge pin 30 and pivots/rotates about the pin axis 33. Because the stud axis 31 and the pin axis 33 are offset from each other, rotation of the hinge pin 30 about stud axis 31 (i.e., rotation of the stud portion relative to the base 22) moves the pin portion (including the upper end 34 of the hinge pin 30) and its pin axis 33 towards or away from, for example, the hinge pin end 25 of the base 22. Because the connecting arm 60 is pivotally/rotatably attached to the pin portion for rotation about the pin axis 33, movement of the pin portion and its pin axis 33 also moves the hinge pin end of the connecting arm 60 to adjust the position of a sash connected to the hinge assembly.

Adjusting the position of the hinge pin 30 relative to the track axis 21 may, however, require some adjustment in the position of the hinge support bracket 40. With reference to FIGS. 6A-6B, the hinge pin support bracket 40 includes an elongated noncircular opening as its bracket fastener opening 44 to allow for movement and/or rotation of the hinge pin support bracket 40 relative to the track axis 21 to accommodate adjustment of the position of the hinge pin 30 relative to the track axis 21. The resulting position of the hinge pin support bracket 40 may result in a hinge pin support bracket 40 that is canted or somewhat misaligned with the track axis 21, but which still provides restraint to the hinge pin 30 as described herein.

Figure 7:
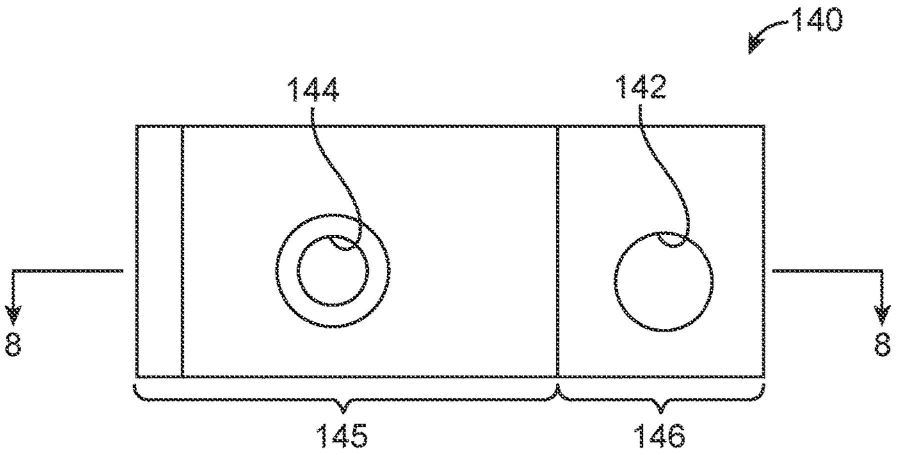
FIG. 7 it is a top view of another illustrative embodiment of a hinge pin support bracket that may be used in one or more embodiments of a hinge assembly as described herein.
Figure 8:
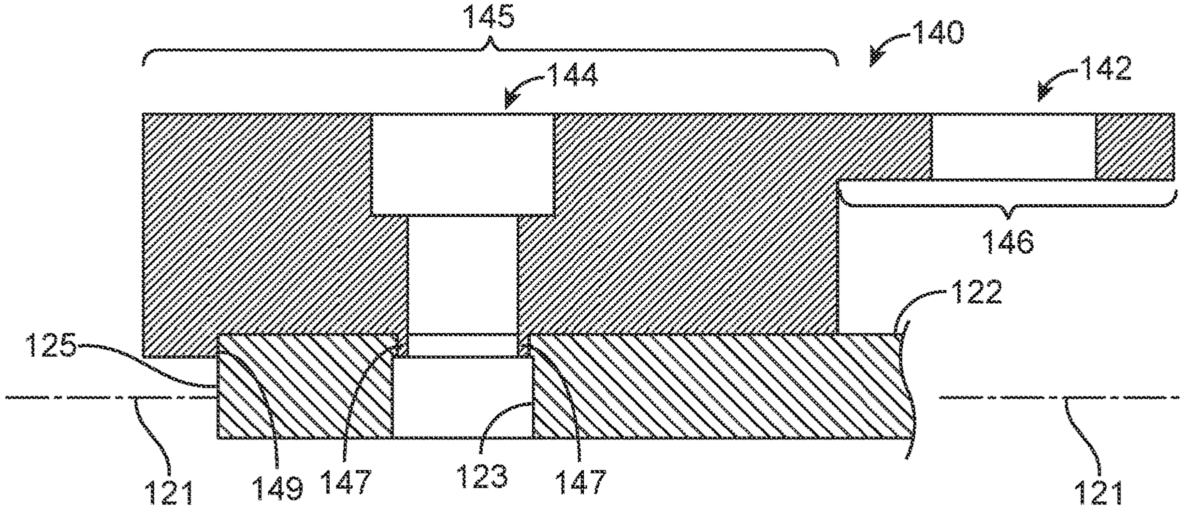
FIG. 8 is an enlarged cross-sectional view of the hinge pin support bracket of FIG. 7 taken along line 8-8 in FIG. 7.
Figure 9:
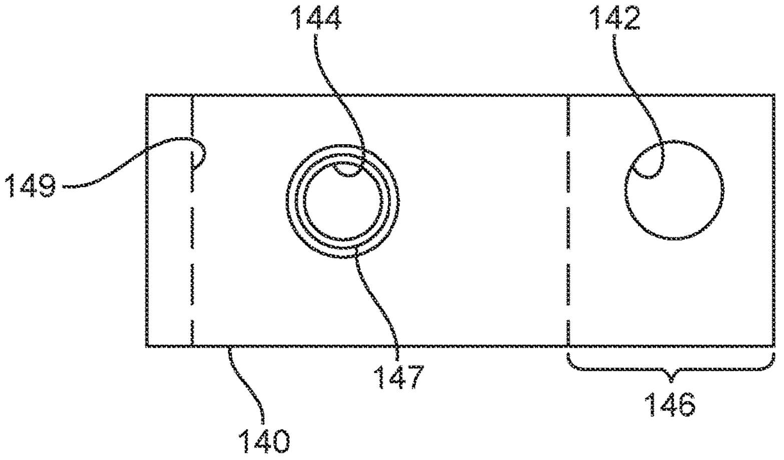
FIG. 9 is a bottom view of the hinge pin support bracket of FIGS. 7-8.

FIG. 7-9 depict an alternative illustrative embodiment of a hinge pin support bracket 140 that may be used in one or more embodiments of a hinge assembly as described herein (with FIG. 8 being an enlarged cross-sectional view of the hinge pin support block of FIG. 7 taken along line 8-8, with a portion of a base 122 to which the hinge pin support block 140 would be attached). The hinge pin support bracket 140 includes a base portion 145 and a support portion 146. The support portion 146 includes a hinge pin bore 142 formed therein. The base portion 145 includes a fastener opening 144 configured to receive a fastener to secure the hinge pin support bracket 142 the base of a track assembly (or directly to a window frame to which the track assembly itself is attached).

With reference to the enlarged cross-sectional view of FIG. 8, another optional feature of one or more embodiments of a hinge pin support bracket that may be used in one or more embodiments of a hinge assembly as described herein is found in the interlocking mechanical features provided in both the base 122 of the track assembly and the hinge pin support bracket 140.

In the depicted illustrative embodiment, the hinge pin support bracket 140 includes a flange 147 sized and shaped to fit within a corresponding fastener opening 123 in the base 122. As a result, the flange 147 and the opening 123 provide one illustrative embodiment of interlocking mechanical features that may enhance transfer of forces from the hinge pin support block 142 the base 122 of a track assembly on which the hinge pin support bracket 140 is mounted.

Flange 147 on hinge pin support block 140 and opening 123 in base 122 are only one example of the myriad of interlocking mechanical features that may be provided between the hinge pin support bracket 140 and the base 122, some examples of which may include, but are not limited to, any complementary protrusions and recesses formed in the facing surfaces of hinge pin support block 140 and the base 122 (e.g., one or more sets of complementary pins and apertures), etc.

Although interlocking mechanical features may be used to transfer loads between the hinge pin support block and a base to which the block is attached, other techniques and/or features may be used to enhance that load transfer in the absence of interlocking mechanical features. For example, adhesives, structured surfaces (e.g., knurled surfaces, etc.), abrasive materials, etc. may be used to enhance friction between the hinge pin support block and a base to which the block is attached, with that friction providing an improved transfer of loads from the support block to the base.

Another feature that may be found in track assemblies including a hinge pin support block as described herein can be found in the shoulder 149 provided on hinge pin support block 140 that, in the depicted embodiment, is adapted to nest with the hinge pin end 125 of the base 122. The shoulder 149 may, in one or more embodiments, be useful in accurately positioning the hinge pin support block 140 relative to the base 122 of a track assembly to which the hinge pin support block 140 is attached.

Figure 10:
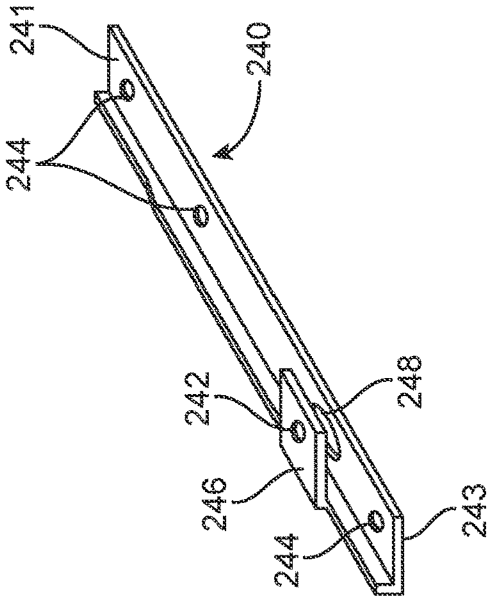
FIG. 10 is a perspective view of another illustrative embodiment of a hinge pin support bracket that may be used in one or more embodiments of a hinge assembly as described herein.
Figure 11:
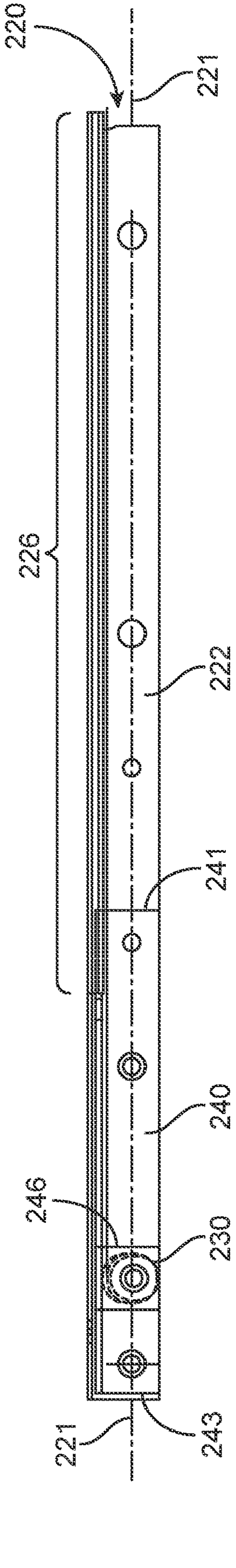
FIG. 11 is a top view of the hinge pin support bracket of FIG. 10 in position to support a hinge pin of a track assembly of a hinge assembly as described herein.

FIGS. 10-11 depict another illustrative embodiment of a hinge pin support block that may be used in one or more embodiments of a hinge assembly as described herein. The hinge pin support block 240 is depicted alone in FIG. 10 and, in FIG. 11, positioned on a base 222 of a track assembly that may be used in one or more embodiments of a hinge assembly as described herein.

The hinge pin support block 240 extends from a first end 241 to a second end 243 and includes one or more openings 244 to facilitate the use of mechanical fasteners to attach the hinge pin support block 242 the base 222 of a track assembly 220 of a hinge assembly as described herein. With reference to FIG. 11, the first end 241 of the hinge pin support block 240 may also serve as a mechanical stop for a shoe that is slidably engaged with the shoe track 226 provided in the track assembly 220.

Hinge pin support block 240 also includes a support portion 246, with a hinge pin bore 242 formed in the support portion 246. In some respects, the remainder of the hinge pin support block 240 may be described as the base portion of the hinge pin support block 240 because it is used to position the support portion 246 over a hinge pin 230 attached to the base 222 of the track assembly 220. The hinge pin support block 240 may further include an access aperture 248 through which the hinge pin 230 extends when the hinge pin is attached to the base 222 and positioned such that its upper portion is restrained within the hinge pin board 242 in the support portion 246.

Figure 12:
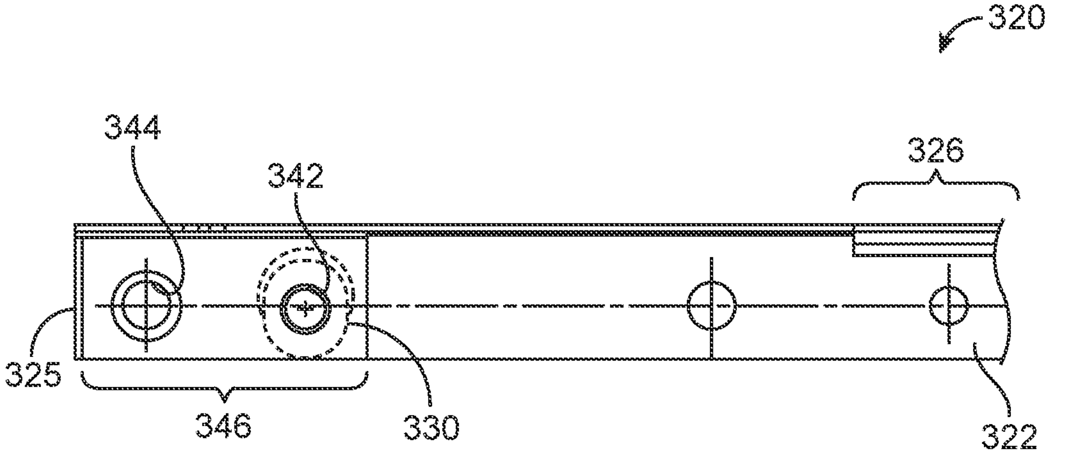
FIG. 12 is a top view of a portion of another illustrative embodiment of a track assembly including a hinge pin support as described herein.
Figure 13:
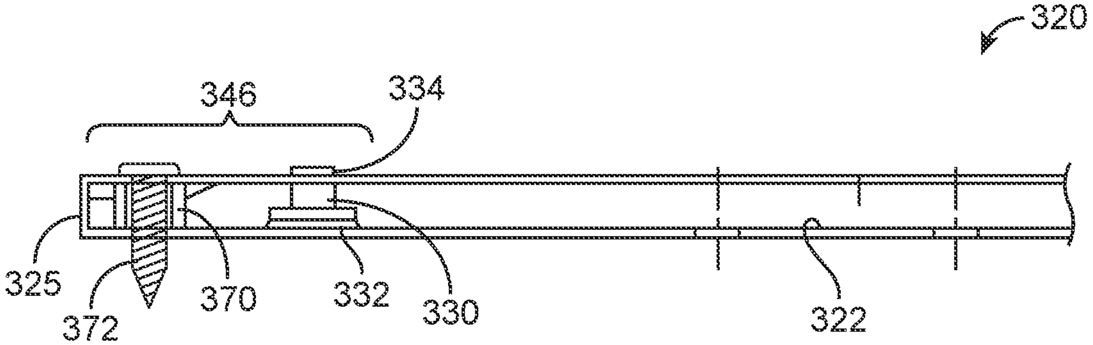
FIG. 13 is a side view of the track assembly depicted in FIG. 12.
Figure 14:
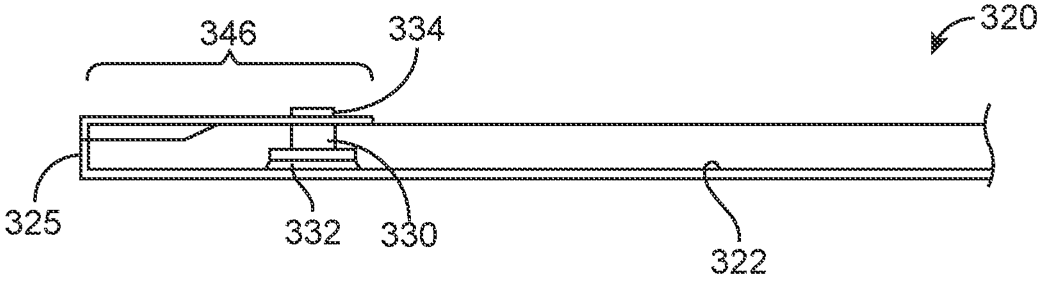
FIG. 14 is a view of the track assembly of FIG. 13 with the mechanical fastener and bushing removed.

Another alternative illustrative embodiment of a hinge pin support is depicted in connection with FIGS. 12-14, with only a portion of the track assembly 320 being depicted. Among the features depicted are a portion of the base 322 extending away from the hinge end 325 and a portion of the shoe track 326 of the track assembly 320.

The portion of track assembly 320 depicted in these figures includes a hinge pin support in the form of a support portion 346 positioned above the base 322 of the track assembly 320, with the support portion 346 including a hinge pin bore 342 used to restrain the upper portion of a hinge pin 330 extending upwards away from the base 322 in a manner similar to that described in connection with other illustrative embodiments of track assemblies as described herein.

Unlike hinge pin support blocks that are provided as separate and discrete articles attached to or positioned relative to the base 322 of the various track assemblies described herein, the support portion 346 is formed as an integral portion of the base 322 which is formed, bent, molded, shaped, etc. such that the support portion 346 is located above a portion of the base 322 to provide support to the upper portion of a hinge pin 330 (i.e., the portion of the hinge pin 330 proximate the upper end 334 of the hinge pin 330) with its base end 332 attached to the base 322 of the track assembly 320.

In one or more embodiments, the support portion 346 may be described as a hinge pin support tab formed integrally with the base 322, with the hinge pin support tab 346 and the base 322 defining a U-shaped structure that includes a bottom from which to legs extend, with the hinge pin 330 extending between the legs of the U-shaped structure distal from the bottom of the U-shaped structure. With reference to, e.g., FIGS. 13-14, the bottom of such a U-shaped structure may correspond to the hinge pin end 325 with one of the legs being formed by the base 322 and the other leg being formed by the hinge pin support tab 346, both of which extend away from the injection and 325 of the track assembly 320.

To provide further structural integrity to the support portion 346, one or more embodiments of such a design may include a bushing 370 and mechanical fastener 372 extending through a fastener opening 344 in the support portion 346. The mechanical fastener 372 may be secured to the remainder of the base 322 of track assembly 320 and/or any underlying structure such as, e.g., a window frame, etc.

Figure 15:
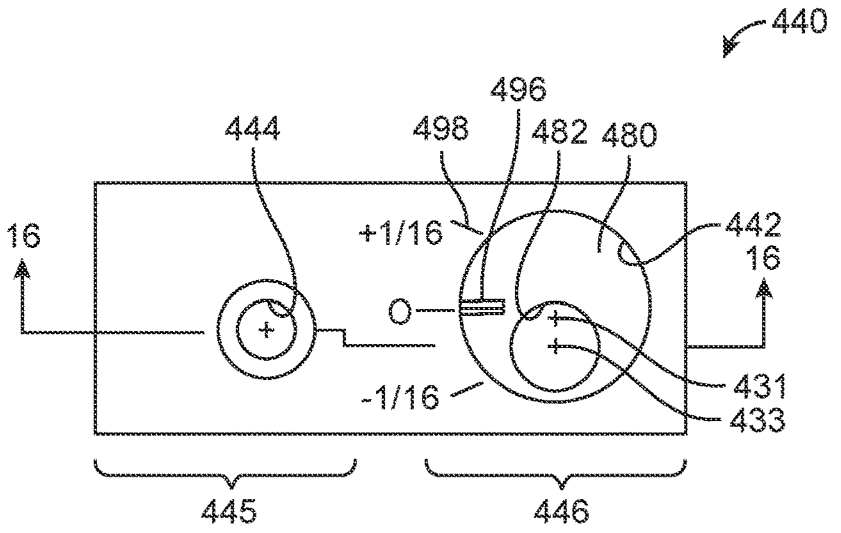
FIG. 15 it is a top view of another illustrative embodiment of a hinge pin support bracket that may be used in one or more embodiments of a hinge assembly as described herein.
Figure 16:
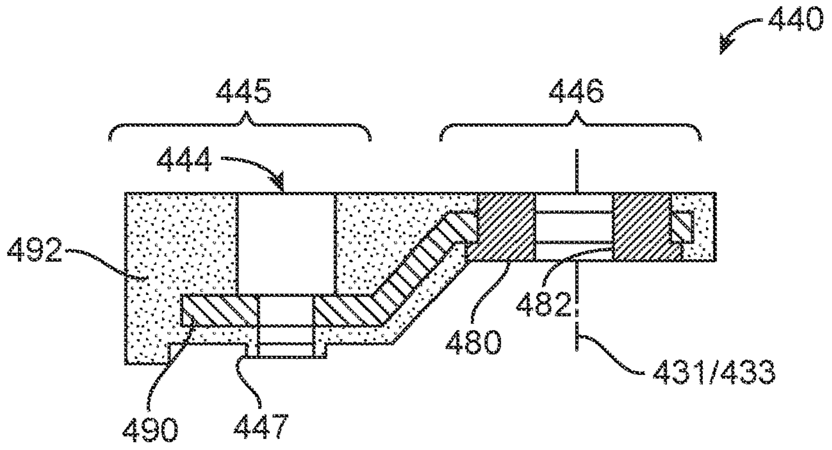
FIG. 16 is a cross-sectional view of the hinge pin support bracket of FIG. 15 taken along line 16-16 in FIG. 15.
Figure 17:
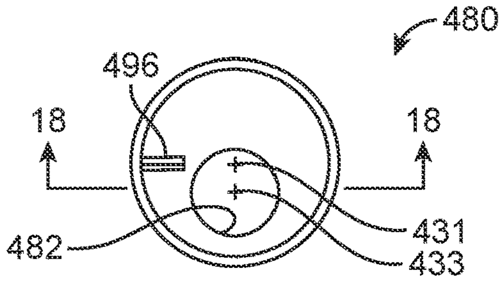
FIG. 17 is a top view of the hinge pin support bushing of the hinge pin support bracket of FIG. 15 removed from the hinge pin support bracket.
Figure 18:
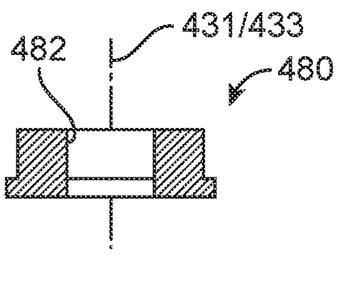
FIG. 18 is a cross-sectional view of the hinge pin support bushing of FIG. 17 taken along line 18-18 in FIG. 17.

FIGS. 15-18 depict another illustrative embodiment of a hinge pin support block 440 that may be used in connection with one or more embodiments of a hinge assembly as described herein. With reference to FIGS. 15-16 (where FIG. 16 is a cross-sectional view of FIG. 15 taken along line 16-16), the hinge pin support block 440 includes a base portion 445 and a support portion 446 similar to many of the other illustrative embodiments of hinge pin support blocks described herein.

A fastener opening 444 is provided in the base portion 445 of hinge pin support block 440. Base portion 445 also includes a flange 447 which may form a portion of an interlocking mechanical structure as described in connection with hinge pin support block 140. The fastener opening 444 can be used to secure the hinge pin support block 442 the base of a track assembly and/or to a window frame to which the base of the track assembly is attached.

Hinge pin support block 440 is, in the depicted illustrative embodiment, includes a core 490 positioned in a body 492. In one or more embodiments, body 492 may be made of one or more different polymeric materials, while core 490 may be formed of one or more different metals or other generally more mechanically rigid materials. This two-piece construction is, however, optional and may not be used in all embodiments.

The hinge pin support block 440 may include a hinge pin bore 442 used to restrain a hinge pin used in connection with the hinge pin support block 440. Unlike other embodiments of hinge pin support blocks described herein, however, the hinge pin support block 440 includes a bushing 480 in the hinge pin bore 442. Bushing 480 includes a bushing aperture 482 with the pin portion of an eccentric hinge pin used in connection with the hinge pin support block 440 being positioned in the bushing aperture 482 of bushing 480.

The bushing aperture 482 and the pin portion of a hinge pin located in the bushing aperture 482 are positioned off-center in the hinge pin bore 442 of hinge pin support block 440. As a result, rotation of an eccentric hinge pin (e.g., a hinge pin similar to hinge pin 30 depicted in FIGS. 5B & 6B) about a stud axis 431 (extending through the center of the hinge pin bore 442) rotates the bushing 480 about the stud axis 431 in the hinge pin bore 442 and moves the pin portion of a hinge pin (and its associated pin axis 433) located in the bushing aperture 482 towards or away from a shoe track to which the hinge pin and the hinge pin support block 440 are attached (in other words, moves the upper portion of the hinge pin along a track axis defined by the track assembly as described herein).

Another feature depicted in connection with the illustrative embodiment of hinge pin support block 440 is the use of visible indicia indicative of the rotational position of the bushing 480 in the hinge pin bore 442 of the hinge pin support block 440. In particular, the visible indicia may take the form of an indicator mark 496 on the bushing 480 and markings 498 on the hinge pin support block 440. In one or more embodiments, the indicator mark 496 and markings 498 may be used together to indicate a position of the pin portion of an eccentric hinge pin relative to a track axis of a track assembly as described herein. As a result, a user may be more able to accurately adjust the position of the pin portion of the hinge pin (and its associated pin axis 433) relative to the track axis using the visible indicia. In the home or zero position, the pin axis 433 may be aligned with the stud axis 431 when viewed from a side as seen in both FIGS. 15 and 17. Rotation of the bushing 480 and the stud portion of the hinge pin about the stud axis 431 of the hinge pin moving the pin portion of the hinge pin (and its pin axis 433) towards or away from, for example, the shoe track of a track assembly.

Figure 19:
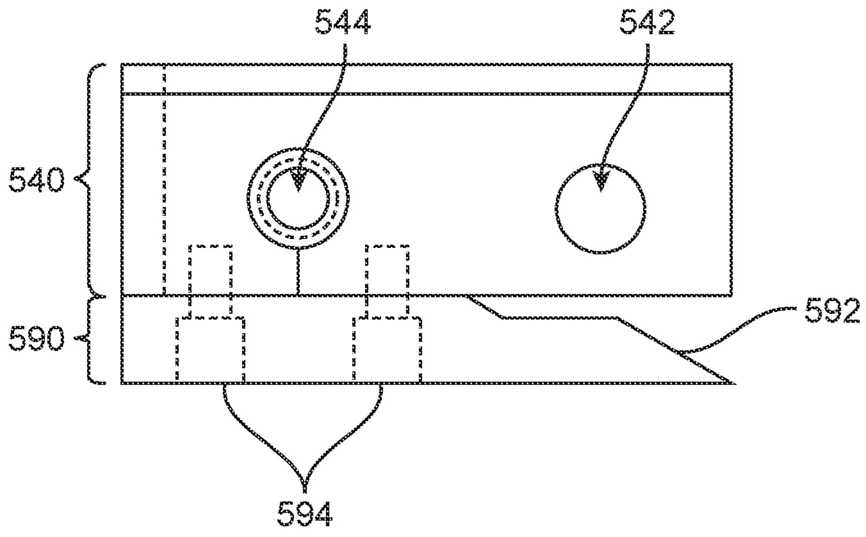
FIG. 19 is a top view of another illustrative embodiment of a hinge pin support bracket including one illustrative embodiment of a vent limiter that may be used in in one of more embodiments of a hinge assembly as described herein.
Figure 20:
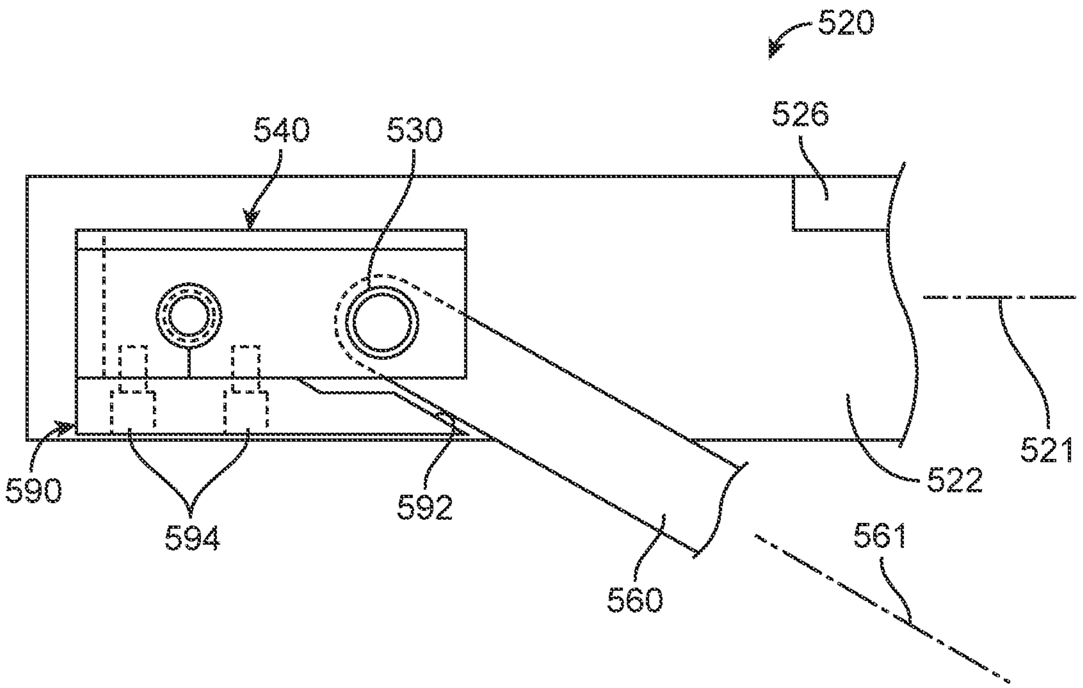
FIG. 20 depicts the hinge pin support bracket and vent limiter of FIG. 20 on a portion of a hinge assembly, with the vent limiter limiting rotation of a connecting arm around the hinge pin.

Another optional feature that may be used in one or more embodiments of hinge pin support brackets of one or more embodiments of hinge assemblies as described herein is depicted in connection with FIGS. 19-20.

One illustrative embodiment of a hinge pin support bracket 540 is depicted in FIG. 19. Hinge pin support bracket 540 includes, as described in connection with any other illustrative embodiments of hinge pin support brackets described herein, includes a hinge pin bore 542 and a fastener bore 544. As described in connection with other illustrative embodiments of hinge pin support brackets, the hinge pin bore 542 is configured to restrain the upper portion of a hinge pin used in a hinge assembly, while the fastener bore 544 can be used to secure the hinge pin support bracket 542 the base of a track assembly of a hinge assembly as described herein.

The hinge pin support bracket 540 also includes a vent limiter 590 attached thereto which can be used to limit rotation of a connecting arm attached to a hinge pin restrained within the hinge pin support bore 542. In particular, vent limiter 590 includes a stop surface 592 against which a connecting arm acts as a hinge assembly is moved from a closed configuration to an open configuration.

More specifically, with reference to FIG. 20, the hinge pin support bracket 540 including the vent limiter 590 are depicted as attached to the base 522 of a track assembly 520 of a hinge assembly as described herein. The track assembly includes a base 522 and shoe track 526 both of which extend along a track axis 521 in a manner similar to other track assemblies as described herein. Also depicted in FIG. 20 are a hinge pin 530 restrained within the hinge pin bore 542 and a connecting arm 560 pivotally connected to the hinge pin 530. Connecting arm 560 extends along a connecting arm axis 560 away from the hinge pin 530 and towards a sash arm as described herein in connection with other illustrative embodiments of hinge assemblies.

As depicted in FIG. 20, connecting arm 560 is in an open position such that connecting arm 560 acts against the stop surface 592 of vent limiter 590, thereby limiting further rotation of the connecting arm 560 about hinge pin 530. Limiting that rotation will, in turn, limit the degree to which a sash connected to the track assembly 520 can be opened within a window frame. Limiting opening of a sash can be useful for safety and security reasons, as well as to limit the likelihood of damage to a window sash if the sash is opened past a selected position.

In the depicted illustrative embodiment of FIGS. 19-20, the vent limiter 590 and the hinge pin support bracket 540 are depicted as being separate and discrete articles that are attached to each other by one or more, in particular two, mechanical fasteners that may be received in bores 594 that extend through the vent limiter 590 and into the hinge pin support bracket 540. Such mechanical fasteners may include, but are not limited to, screws, bolts, rivets, etc.

Alternatively, the hinge pin support bracket 540 and vent limiter 590 may be attached to each other by any suitable technique or combination of techniques including, mechanical fasteners, adhesives, welding, mechanically interlocking connections, etc. in still other alternative embodiments, the hinge pin support bracket 540 and vent limiter 590 may be manufactured together as one integral hinge pin support bracket including a vent limiter, with the hinge pin support bracket including integral vent limiter being manufactured by any suitable technique or combination of techniques including, casting, forging, machining, etc.

Figure 21:
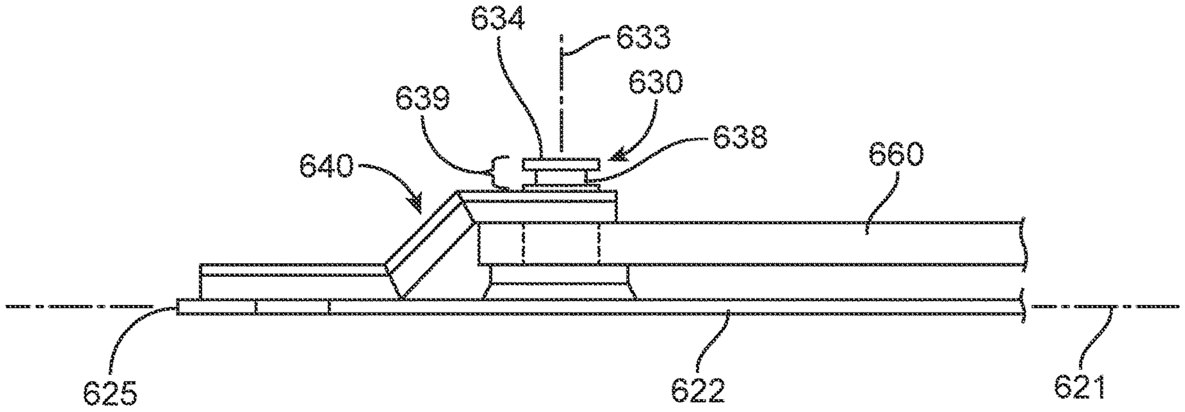
FIG. 21 is a side view of another illustrative embodiment of a hinge pin support bracket including an alternative hinge pin one that may be used in in one of more embodiments of a hinge assembly as described herein.

Yet another optional feature that may be provided in one or more embodiments of the hinge assemblies described herein is depicted in connection with FIG. 21. In particular, the illustrative embodiment depicted in FIG. 21 includes a base 622 of a track assembly with a hinge pin 630 attached to the base 622 as described herein. The base 622 of the track assembly extends along a track axis 621, with only a portion of the base 622 including a hinge pin end 625 and extending towards the shoe end of the base 622 being depicted in FIG. 21.

A portion of a connecting arm 660 used in the hinge assembly is depicted as being attached to the hinge pin 630 for rotation about the pin axis 633 in much the same manner as described in connection with rotation of connecting arms of hinge assemblies around pin axes defined by hinge pins as described herein.

The hinge assembly is also depicted as including a hinge pin support in the form of a hinge pin support bracket 640. The depicted illustrative embodiment of hinge pin support bracket 640 includes a base portion that may be attached to the base 622 as described in connection with other illustrative embodiments of hinge pin support brackets described herein. The hinge pin support bracket 640 also includes a support portion that extends above the base 622 and includes, as described in connection with other illustrative embodiments of hinge pin support brackets described herein, a hinge pin bore through which the hinge pin 630 extends.

One difference between the hinge pin 630 and hinge pin support bracket 640 depicted in FIG. 21 as compared to other illustrative embodiments of hinge pin supports and hinge pins as described herein is that the hinge pin 630 protrudes above the hinge pin support bracket. The hinge pin 630 includes a ring slot 638 position above the support portion of the hinge pin support bracket such that the hinge pin support bracket 640 can be placed over the hinge pin 632 restrain the hinge pin 630 while still allowing a user to install a C-clip or other retaining feature on the hinge pin 630 as needed. As a result, the hinge pin 630 may be described as having a protruding portion 639 located above the support portion of the hinge pin support bracket 640. This design may, in one or more embodiments, simplify installation of the hinge assembly using an extended hinge pin in combination with a hinge pin support as described herein.

Figure 22:
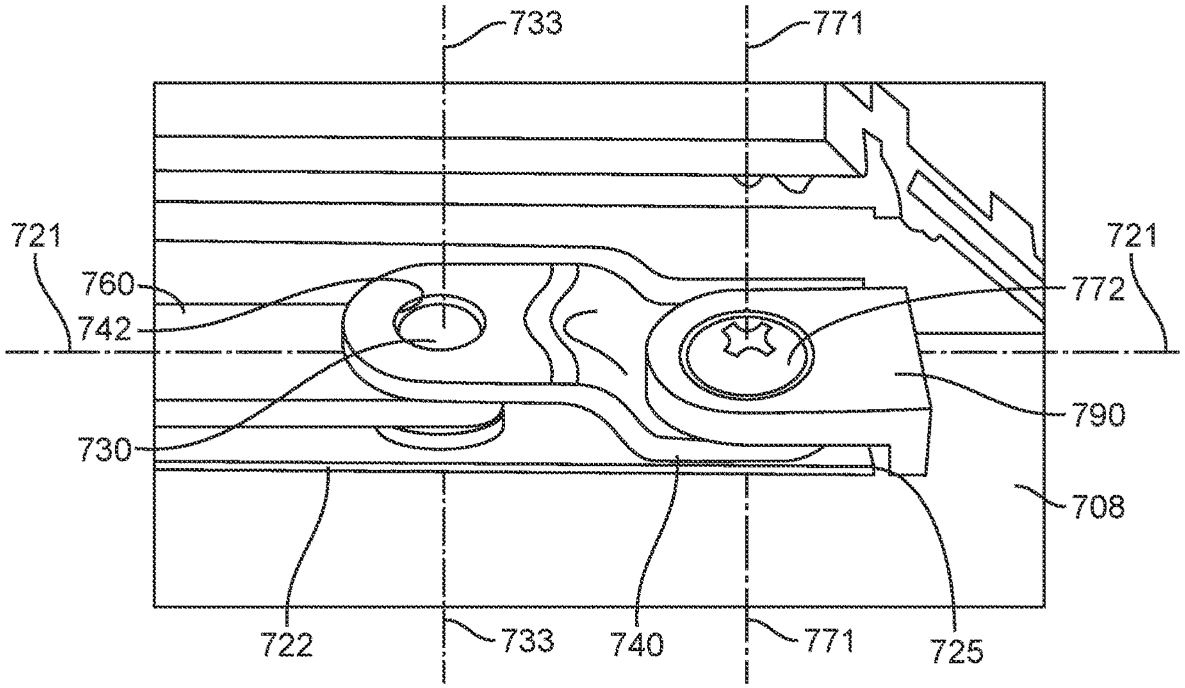
FIG. 22 is a perspective view of another illustrative embodiment of the hinge pin end of a hinge assembly as described herein.

A portion of another illustrative embodiment of a hinge assembly for supporting a rotating sash in a window frame as described herein is depicted in FIGS. 22-27. In particular, FIG. 22 is a perspective view of the components of the hinge assembly used to provide support for a hinge pin 730 in their assembled state. Although not depicted in FIGS. 22-27, it should be understood that the other components of hinge pin assemblies as described herein and depicted in the figures would be provided in a hinge assembly incorporating the components depicted in FIGS. 22-27 and described in connection with those figures.

The depicted hinge assembly includes a base 722 located on a window frame member 708, with the base 722 extending along a track axis 721 as described in connection with other bases and track axes described herein. Hinge pin 730 is attached to the base 722 as described herein in connection with other illustrative embodiments. Also depicted in FIG. 22 is a portion of a connecting arm 760 rotatably attached to the hinge pin 730, with the connecting arm 760 rotating about hinge pin axis 733 defined by the hinge pin 730.

The upper end of the hinge pin 730 is supported by the depicted embodiment of hinge pin support bracket 740 which includes a hinge pin bore 742 in which the upper portion of the hinge pin 730 is located. The hinge pin support bracket 740 is attached to the base 722 and the window frame member 708 using, in the depicted illustrative embodiment, a threaded fastener 772 (although any other suitable fastener could be used in place of a threaded fastener 772 as described herein).

In the illustrative embodiment depicted in FIGS. 22-27, a bracket clip 790 is provided in addition to the hinge pin support bracket 740. In one or more embodiments of hinge assemblies as described herein that include a bracket clip such as bracket clip 790, the bracket clip 790 may extend past the hinge pin end 725 of the base 722 as seen in, e.g., FIG. 22.

Figure 23:
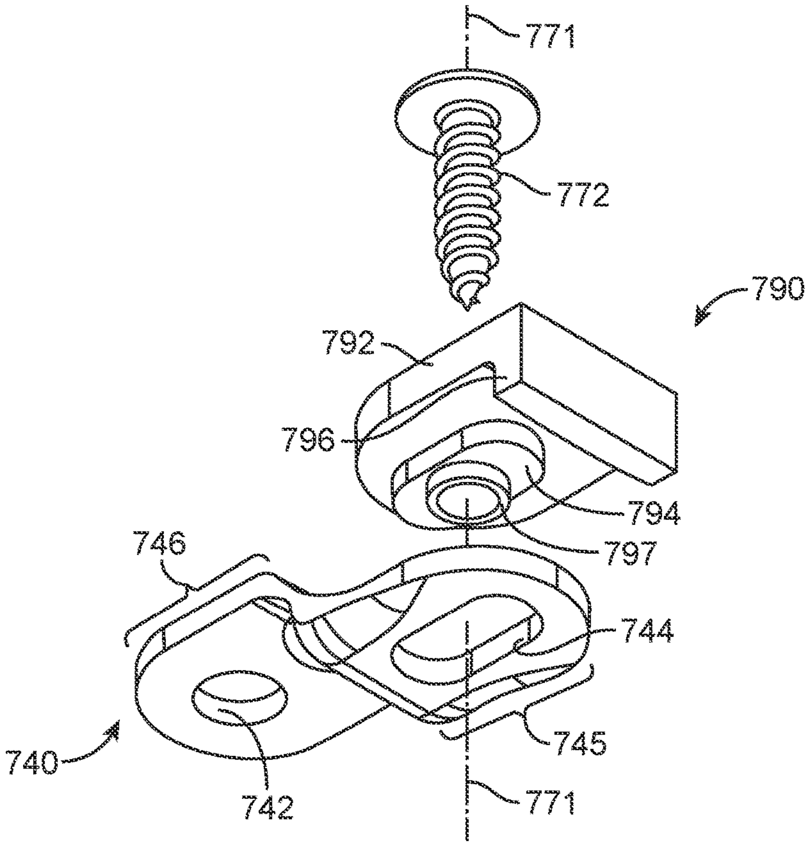
FIG. 23 is an exploded perspective view of the hinge pin support bracket, bracket clip, and fastener of the hinge pin assembly of FIG. 22.
Figure 24:
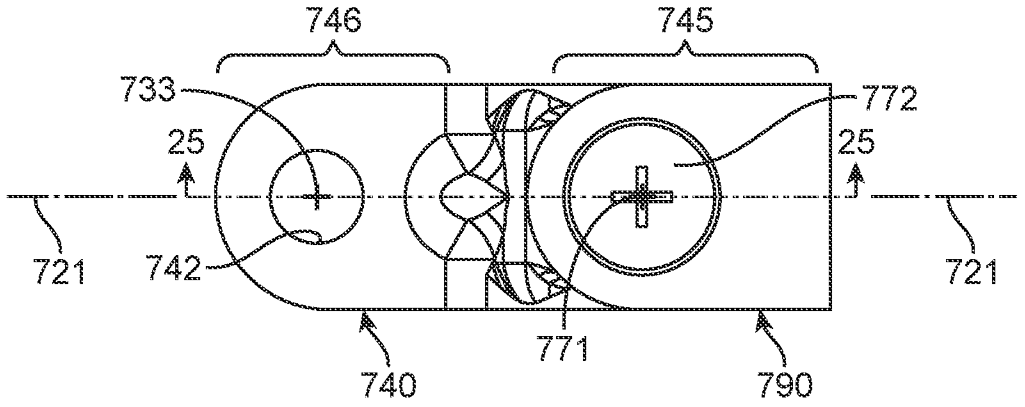
FIG. 24 is a top plan view of hinge pin support bracket, bracket clip, and fastener of the hinge pin assembly of FIG. 23.

FIG. 23 is an exploded perspective view of the hinge pin support bracket 740, bracket clip 790, and fastener 772 of the hinge pin assembly depicted in FIG. 22. As discussed above, the hinge pin bracket 740 includes a hinge pin bore 742 configured to receive the upper end of a hinge pin as described herein. Hinge pin support bracket 740 also includes a fastener opening 744. The fastener 772 defines an axis 771 extending therethrough, with the bracket clip 790 and hinge support bracket 740 being, in one or more embodiments, configured to rotate about the axis 771 as described herein.

In the depicted illustrative embodiment of hinge pin bracket 740, the bracket includes a base portion 745 and a support portion 746 as described in connection with, for example, hinge pin support bracket 40 depicted in FIGS. 3-4. The base portion 745 of hinge pin support bracket 740 is used to attach the hinge pin support bracket 740 to the base 722 and/or the window frame 708. The support portion 746 includes a hinge pin bore 742 two restrain the upper portion of a hinge pin (e.g., hinge pin 730) located therein. The support portion 746 may be described as being cantilevered over the hinge pin that is supported by the support portion of the hinge pin support bracket 742 provide a gap between the support portion 746 and the base 722, with the connecting arm 760 being positioned about the hinge pin 730 in the gap provided between the hinge pin support bracket 740 and the base 722.

The bracket clip 790 is also depicted in FIG. 23. The depicted embodiment of bracket clip 790 includes a base portion 792 from which a boss 794 protrudes. In particular, the boss 794 protrudes from the underside of the body portion 792 of the bracket clip 790 (where the underside of the body portion 792 is the surface of the bracket clip 790 facing the base portion 745 of the hinge support bracket 740).

Boss 794 is, in the depicted embodiment, configured to fit within the bracket opening 744 in the base portion 745 of the hinge support bracket 740. The boss 794 protruding from the base portion 792 of bracket clip 790 and corresponding bracket opening 744 in base portion 745 of hinge support bracket 740 depict only one embodiment of interlocking mechanical features found in the base portion 745 of the hinge support bracket 740 and the bracket clip 790 that cooperate to prevent rotation of the hinge pin support bracket 740 and the bracket clip 790 relative to each other about an axis extending through the base 722, the base portion 745 of the hinge pin support bracket 740 and the bracket clip 790 (see, e.g., FIG. 22). In the depicted embodiment, that axis may be defined by the axis 771 extending through the fastener 772.

The complementary elongated shapes of both the bracket opening 744 in base portion 745 of hinge pin support bracket 740 and the boss 794 protruding from the base portion 792 of bracket clip 790 illustrate only one set of complementary shapes that form interlocking mechanical features between the hinge pin support bracket and bracket clips of hinge assemblies as described herein. Many other alternative interlocking mechanical shapes configured to prevent rotation between the hinge pin support bracket 740 and the bracket clip 790 relative to each other are, of course, possible.

Figure 25:
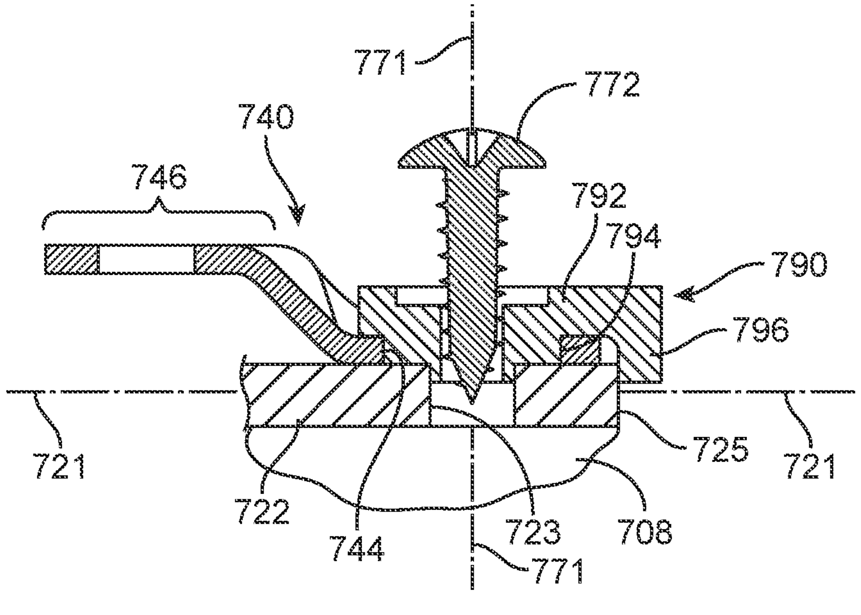
FIG. 25 is a cross-sectional view of the hinge pin support bracket, bracket clip, and fastener of the hinge pin assembly of FIGS. 23-24 taken along line 25-25 in FIG. 24.
Figure 26:
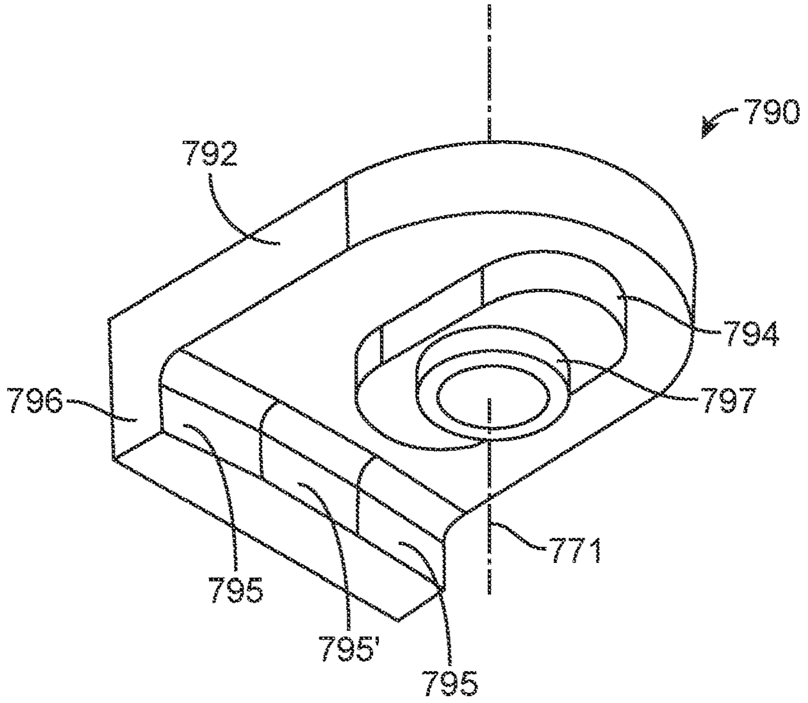
FIG. 26 is a perspective view of the underside of the illustrative embodiment of the bracket clip depicted in FIGS. 21-25.

In the depicted illustrative embodiment of bracket clip 790, a flange 797 protrudes from the boss 794 of the bracket clip 790. Flange 797 is, in one or more embodiments, configured to fit within a fastener opening provided in the base 722 of the hinge assembly including bracket clip 790. The relationship between flange 797 and a fastener opening 723 in base 722 is seen in the partial cross-sectional view of FIG. 25. In a manner similar to that discussed in connection with the hinge pin support bracket 140 which includes a flange 147 sized and shaped to fit within a corresponding fastener opening 123 in base 122 as seen in FIG. 8, flange 797 on bracket clip 790 is sized and shaped to fit within a corresponding fastener opening 723 in base 722 as depicted in FIG. 25.

The flange 797 and opening 723 provide only one illustrative embodiment of interlocking mechanical features that may be provided to transfer loads between the hinge pin support bracket 740 and the base 722 (as well as the underlying frame member 708). Those loads may be generated on the hinge pin 730 through connecting arm 760 as described elsewhere herein.

Taken together, the interlocking mechanical features used to transfer loads to the base of a hinge assembly (and/or the frame member on which that hinge assembly is mounted) from a hinge pin using a hinge pin support bracket can be, in one illustrative embodiment, found in the combination of the flange 797 and opening 723 in base 722 as well as the boss 794 on bracket clip 790 and the opening 744 in the base portion 745 of the hinge pin support bracket 740. Both sets of complementary interlocking mechanical features found in that set of components provides a load transfer path from the top of the hinge pin to the base 722 and/or the frame member on which the hinge assembly is mounted.

Further, it should be noted that the complementary shapes of the flange 797 and opening 723 in base 722 (i.e. the interlocking mechanical features) allow for rotation of the bracket clip 790 and hinge pin support bracket 740 about the axis 771 passing through, in the depicted embodiment, the fastener 772. That rotation may be useful where, for example, the position of the hinge pin 730 (see, e.g., FIG. 22) relative to the base 722 needs to be adjusted for proper closure of a sash supported by the depicted hinge assembly as described herein. Those types of adjustments are, for example, described in connection with the hinge pin support bracket 40 and hinge pin 30 depicted in FIGS. 5A-6B. Adjusting the position of an eccentrically mounted hinge pin 730 on base 722 can often only be accomplished by rotation of the hinge pin support bracket 740 and bracket clip 790 about axis 771 extending through fastener 772 (in addition to rotating the eccentrically mounted hinge pin).

In addition to providing for rotation of the hinge pin support bracket 740 about an axis passing through the base 722, base portion 745 of hinge pin support bracket 740 and bracket clip 790 (such as, for example, axis 771 passing through fastener 772 in the depicted embodiment) to allow for adjustment of the location of a hinge pin 730 on base 722, it may be desirable to limit the amount of any such rotation.

In the depicted illustrative embodiment, bracket clip 790 may include features that are configured to allow for some degree of rotation of the bracket clip and, therefore, the hinge pin support bracket relative to an axis passing through the base 722, base portion 745, and bracket clip 790 (such as, for example, axis 771). In particular, bracket clip 790 includes, as described above, a base portion 792, but also includes a mechanical stop 794 that is configured to act on the hinge pin end 725 of the base 722 when the bracket clip 790 and hinge pin support bracket 740 are assembled on the base 722 (as seen in, for example, FIG. 22).

Figure 27:
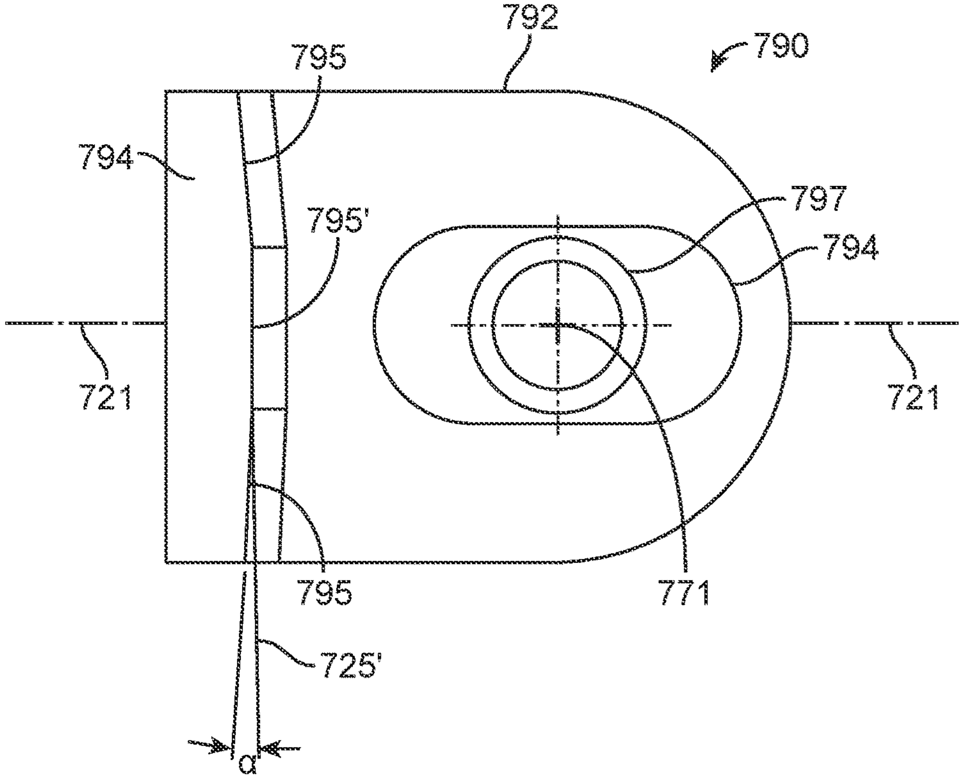
FIG. 27 is a plan view of the underside of the bracket clip depicted in FIG. 26.

In one or more embodiments, the mechanical stop 794 of bracket clip 790 may include one or more surfaces 795 and 795' configured to act on the hinge pin end 725 of the base 722. In the depicted illustrative embodiment, central surface 795' may be oriented perpendicular to the track axis 721 defined along the length of the base 722 while the corresponding hinge pin end 725 of base 722 is also oriented perpendicular to the track axis 721. The depicted illustrative embodiment of bracket clip 790 also includes, however, side surfaces 795 that are not oriented perpendicular to the track axis 721. As a result, rotation of the bracket clip 790 about axis 771 (and corresponding rotation of the hinge pin support bracket 740) is allowed up to a selected limit. With reference to FIG. 27, the side surfaces 795 may allow for rotation of the bracket clip 790 (and corresponding rotation of the hinge pin support bracket 740) over an angle α (alpha) of, for example, 10° or less, 8° or less, 6° or less, 4° or less, or 2° or less.

Although the depicted embodiment of bracket clip 790 includes side surfaces 795 oriented at the same angle relative to the track axis 721, one or more alternative embodiments of hinge assemblies as described herein may include a bracket clip 790 that include side surfaces provided with different angular orientations relative to the track axis. Moreover, although the depicted embodiment of bracket clip 790 includes a pair of side surfaces, one or more alternative embodiments of bracket clips as described herein may include only one side surface oriented at an angle relative to the track axis that allows for rotation of the bracket clip and hinge pin support bracket as described herein. Further, although the depicted embodiment of bracket clip 790 includes a central surface 795' that is aligned with the edge at the hinge pin end 725 of the base 722, one or more alternative embodiments of bracket clips as described herein may not include an aligned surface such as central surface 795'.

In still other variations, the hinge pin end 725 of the base 722 may not be perpendicular to the track axis 721 but may, instead, include features configured to allow for rotation of the bracket clip 790 and hinge pin support bracket 740 as needed to adjust the position of a hinge pin 730. In such embodiments, the mechanical stop 794 provided on bracket clip 790 may have any shape complementary to the shape of the hinge pin end 725 a base 722 needed to control rotation of the bracket clip 790 and hinge pin support bracket 740 relative to an axis extending through those components as well as the base of the hinge assembly. For example, the hinge pin end 725 of base 722 may include one or more surfaces oriented at a non-perpendicular angle relative to the track axis 721 while the mechanical stop 794 includes, for example, a single flat surface configured to interact with the hinge pin end 725 of base 722 in a manner that allows for rotation of the bracket clip 790 and hinge pin support bracket 740 as described herein.

While the boss 794 on bracket clip 790 and the opening 744 in the hinge pin support bracket 740 along with flange 797 on bracket clip 790 and a corresponding opening 723 in base 722 provide one illustrative embodiment of a set of interlocking mechanical features used to control rotation between the bracket clip 790 and hinge pin support bracket 740 as well as provide for load transfer from a hinge pin through the hinge pin support bracket 742 the base 722 and/or an underlying window frame member, many other alternative interlocking mechanical features may perform those same functions.

Figure 28:
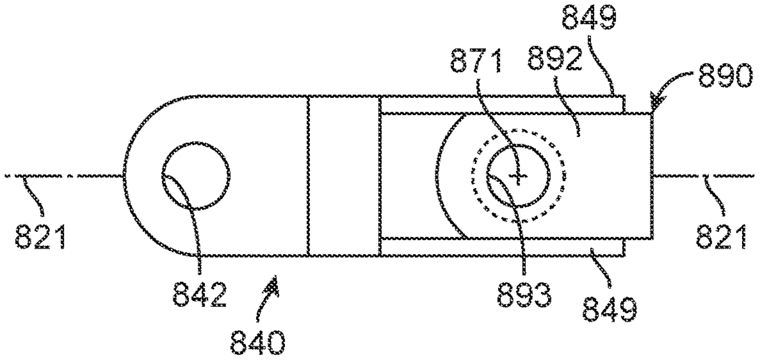
FIG. 28 is a top plan view of another illustrative embodiment of a hinge pin support bracket and bracket clip for use in a hinge assembly as described herein.
Figure 29:
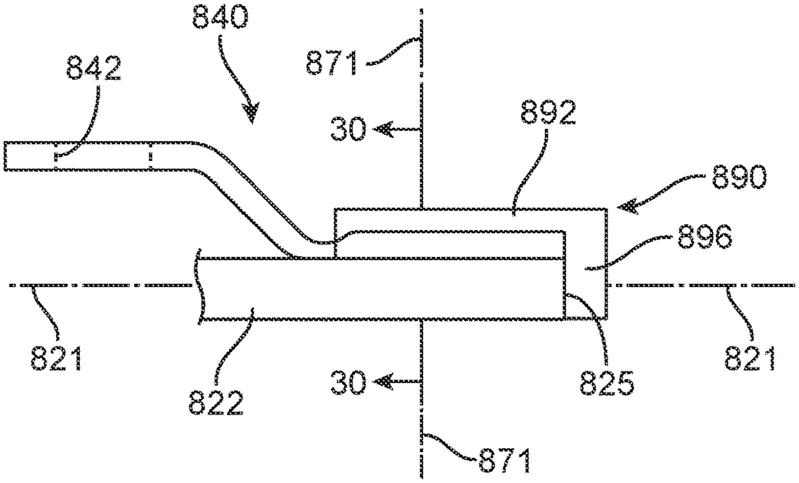
FIG. 29 is a side elevation view of the hinge pin support bracket and bracket clip depicted in FIG. 28 along with a portion of a base on which the hinge pin support bracket and bracket clip are mounted.
Figure 30:
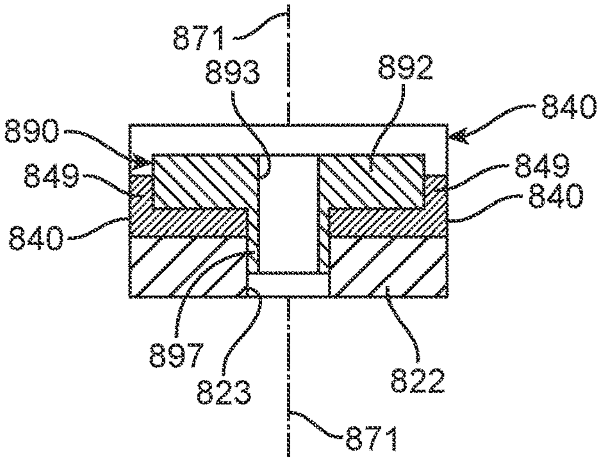
FIG. 30 is a cross-sectional view of the hinge pin support bracket and bracket clip of FIGS. 28-29 taken along line 30-30 in FIG. 29.

For example, FIGS. 28-30 depict another illustrative embodiment of a hinge pin support bracket and bracket clip for use in a hinge assembly as described herein that includes a set of interlocking mechanical features configured to control rotation between a bracket clip and hinge pin support bracket, as well as to provide for load transfer from a hinge pin supported by the hinge pin support bracket to a base and/or underline window frame member on which the hinge assembly including these components is mounted.

In particular, a hinge pin support bracket 840 and bracket clip 890 are provided to support the upper portion of a hinge pin as described in connection with other illustrative embodiments of hinge pin support brackets described herein. The hinge pin support bracket 840 includes a hinge pin opening 842 and extends along a track axis 821. The bracket clip 890 of FIGS. 28-30 includes a fastener opening 893 through which a fastener opening axis 871 extends, with axis 871 being comparable to axis 771 depicted in connection with the illustrative embodiment of hinge pin support bracket 740 and bracket clip 790 depicted in FIGS. 22-27.

With reference to FIG. 29, the hinge pin support bracket 840 is mounted on a base 822 which includes a hinge pin end 825. Bracket clip 890 includes a mechanical stop 896 that interacts with hinge pin end 825 of base 822 in the same manner as discussed above in connection with mechanical stop 796 on bracket clip 790 and hinge pin end 725 of base 722. Moreover, the variations discussed with respect to mechanical stop 796 and hinge pin end 725 would apply equally in this alternative embodiment of mechanical stop 896 and hinge pin end 825.

Control over relative rotation between the bracket clip 890 and the hinge pin support bracket 840 is provided in the embodiment depicted in FIGS. 28-30 by interlocking mechanical features in the form of the body 892 of bracket clip 890 and a pair of flanges 849 provided on hinge pin support bracket 840. In particular, the body 892 of bracket clip 890 nests within the flanges 849 of hinge pin support bracket 840 such that rotation of the hinge pin support bracket 840 relative to the bracket clip 890 about axis 871 is prevented. Although the depicted embodiment includes a pair of flanges 849, in one or more alternative embodiments, only one flange 849 may be provided in may be sufficient to provide control over relative rotation between the hinge pin support bracket 840 and bracket clip 890.

In the embodiment of bracket clip 890, load transfer from the hinge pin support bracket 840 to the base 822 (and/or an underlying frame member on which these components are mounted) may be accomplished through a flange 897 extending into opening 823 in base 822 as seen in, e.g., FIG. 30. As discussed above, the flange 897 and opening 823 in which the flange 897 is received may be circular to allow for rotation of the bracket clip 890 and hinge pin support bracket 840 about axis 871 to allow for adjustment of the position of a hinge pin supported by the hinge pin support bracket 840 as discussed herein in connection with other embodiments.

Figure 31:
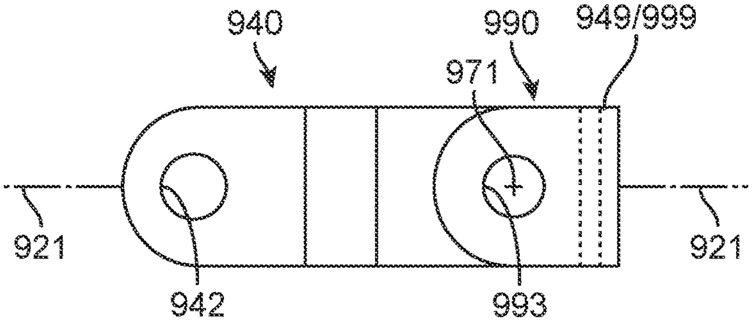
FIG. 31 is a top plan view of another illustrative embodiment of a hinge pin support bracket and bracket clip for use in a hinge assembly as described herein.
Figure 32:
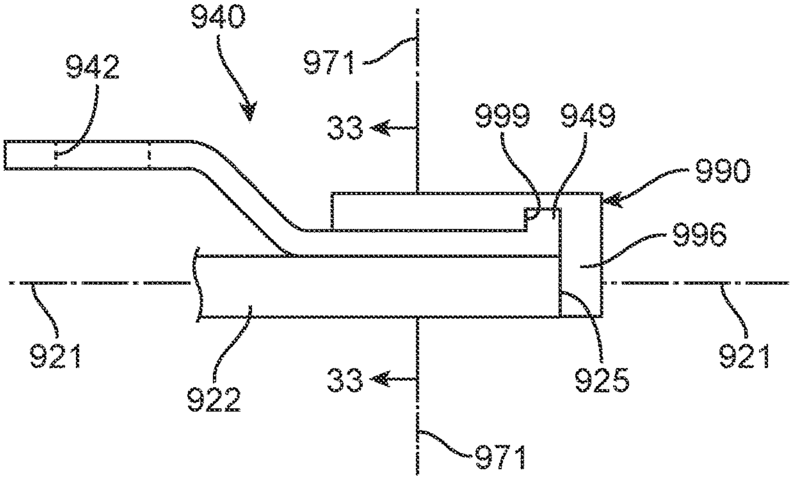
FIG. 32 is a side elevation view of the hinge pin support bracket and bracket clip depicted in FIG. 31 along with a portion of a base on which the hinge pin support bracket and bracket clip are mounted.
Figure 33:
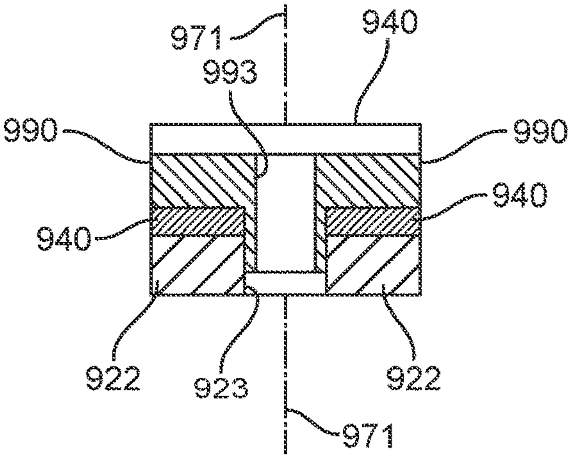
FIG. 33 is a cross-sectional view of the hinge pin support bracket and bracket clip of FIGS. 31-32 taken along line 33-33 in FIG. 32.

Another illustrative embodiment of a hinge pin support bracket and bracket clip that may be used in a hinge assembly as described herein is depicted in FIGS. 31-33. The hinge pin support bracket and bracket clip depicted in those figures includes another alternative set of interlocking mechanical features configured to control rotation between a bracket clip and hinge pin support bracket, as well as to provide for load transfer from a hinge pin supported by the hinge pin support bracket to a base and/or underline window frame member on which the hinge assembly including these components is mounted.

In particular, a hinge pin support bracket 940 and bracket clip 990 are provided to support the upper portion of a hinge pin as described in connection with other illustrative embodiments of hinge pin support brackets described herein. The hinge pin support bracket 940 includes a hinge pin opening 942 and extends along a track axis 921. The bracket clip 990 of FIGS. 31-33 includes a fastener opening 993 through which a fastener opening axis 971 extends, with axis 971 being comparable to axis 771 depicted in connection with the illustrative embodiment of hinge pin support bracket 740 and bracket clip 790 depicted in FIGS. 22-27.

With reference to FIG. 32, the inch pin support bracket 940 is mounted on a base 922 which includes a hinge pin end 925. Bracket clip 990 includes a mechanical stop 996 that interacts with the hinge pin end 925 of base 922 in the same manner as described above in connection with mechanical stop 796 on bracket clip 790 and hinge pin end 725 of base 722. Moreover, the variations discussed with respect to mechanical stop 796 and hinge pin end 725 would apply equally in this alternative embodiment of mechanical stop 996 and hinge pin end 925.

Control over relative rotation between the bracket clip 990 and the hinge pin support bracket 940 is provided in the embodiment depicted in FIGS. 31-33 by interlocking mechanical features in the form of a flange 949 provided in the hinge pin support bracket 940 proximate the end of the hinge pin support bracket 940 that is near the hinge pin end 925 of the base 922. The flange 949 may, for example, extend across a width of the hinge pin support bracket 940 in a direction generally perpendicular to the track axis 921. The flange 949 has a shape complementary and is received within a slot 999 provided in the bracket clip 990. The flange 949 of hinge pin support bracket 940 and complementary slot 999 provided in the bracket clip 990 are seen in the top plan view of FIG. 31 (with the speakers being depicted in broken lines) as well as in the side elevation view of FIG. 32. Although the depicted embodiment includes a flange 949 that extends across the entire width of the hinge pin support bracket 940, in one or more alternative embodiments, the flange 949 may extend only over a portion of the width of the hinge pin support bracket 940. Other variations will, of course, also be possible.

In the embodiment of bracket clip 990, load transfer from the hinge pin support bracket 940 to the base 922 (and/or an underlying frame member on which these components are mounted) may be accomplished through a flange 997 extending into opening 923 in base 922 as seen in, e.g., FIG. 33. As discussed above, the flange 997 and opening 923 in which the flange 997 is received may be circular to allow for rotation of the bracket clip 990 and hinge pin support bracket 940 about axis 971 to allow for adjustment of the position of a hinge pin supported by the hinge pin support bracket 940 as discussed herein in connection with other embodiments.

The complete disclosure of the patents, patent documents, and publications identified herein are incorporated by reference in their entirety as if each were individually incorporated. To the extent there is a conflict or discrepancy between this document and the disclosure in any such incorporated document, this document will control.

Illustrative embodiments of hinge assemblies and methods are discussed herein with some possible variations described. These and other variations and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof. It should also be understood that this invention also may be suitably practiced in the absence of any element not specifically disclosed as necessary herein.

What is claimed is:

1. A hinge assembly for supporting a rotating sash in a window frame, the hinge assembly comprising:

a track assembly configured for attachment to a window frame, the track assembly comprising a base, a shoe track, and a hinge pin, wherein the base extends along a track axis from a hinge pin end to a shoe track end, wherein the shoe track extends along the track axis, and wherein the shoe track extends from the shoe track end towards the hinge pin end, wherein the hinge pin comprises a base end connected to the base proximate the hinge pin end of the base and an upper end distal from the base;

a shoe slidably engaged with the shoe track, wherein the shoe is configured to slide along the shoe track end the shoe is restrained from moving transverse to the track axis when the shoe is slidably engaged with the shoe track;

a sash arm configured for attachment to a rotating sash, the sash arm extending from a shoe end to a distal end, wherein the shoe end is pivotally coupled to the shoe;

a connecting arm extending from a hinge pin end to a sash end, wherein the sash end is pivotally connected to the sash arm at an intermediate location spaced from the shoe end of the sash arm, and wherein the hinge pin end of the connecting arm is pivotally connected to the hinge pin for rotation about a pin axis extending through the base end and the upper end of the hinge pin; and a hinge pin support attached to the base of the track assembly, the hinge pin support comprising a support portion extending above the base of the track assembly, wherein the support portion comprises a hinge pin bore, wherein a portion of the hinge pin is located in the hinge pin bore such that the hinge pin support restrains the upper end of the hinge pin from movement relative to the base, and wherein hinge pin extends through an opening in the connecting arm proximate the hinge pin end of connecting arm such that the hinge pin end of the connecting arm is located between the support portion and the base of the track assembly.

2. A hinge assembly according to claim 1, wherein the hinge pin support comprises a hinge pin support bracket separate and discrete from the base of the track assembly.

3. A hinge assembly according to claim 2, wherein the hinge pin support bracket and the base of the track assembly comprise interlocking mechanical features configured to transfer mechanical loads directed along the track axis on the hinge pin to the base and the hinge support bracket.

4. A hinge assembly according to claim 2, wherein the base comprises a base fastener aperture and wherein the hinge pin support bracket comprises a bracket fastener aperture, wherein the base fastener aperture is aligned with the bracket fastener aperture when the hinge pin support bracket is secured relative to the base by the mechanical fastener.

5. A hinge assembly according to claim 4, wherein the hinge pin support bracket and the base of the track assembly comprise interlocking mechanical features configured to transfer mechanical loads directed along the track axis on the hinge pin to the base and the hinge pin support bracket when the hinge pin support bracket is secured relative to the base by the mechanical fastener.

6. A hinge assembly according to claim 5, wherein the interlocking mechanical features are located proximate the base fastener opening and the bracket fastener opening.

7. A hinge assembly according to 4, wherein the bracket fastener opening comprises an elongated non-circular opening such that a position of the hinge pin bracket relative to the base is adjustable along the track axis.

8. A hinge assembly according to claim 2, wherein the hinge pin support bracket comprises a vent limiter configured to limit rotation of the connecting arm around the hinge pin when the hinge assembly is moving from a closed configuration to an open configuration.

9. A hinge assembly according to claim 8, wherein the hinge pin support bracket and the vent limiter each comprise separate and discrete articles attached to each other.

10. A hinge assembly according to claim 1, wherein the hinge pin support comprises a hinge pin support bracket separate and discrete from the base of the track assembly, wherein a base portion of the hinge pin support bracket is positioned on the base and a support portion of the hinge pin support bracket is positioned above the base of the track and the base portion of the hinge pin support bracket, and wherein the base portion comprises an access aperture through which the hinge pin extends such that the hinge pin extends between the base and the support portion of the hinge pin support bracket.

11. A hinge assembly according to claim 10, wherein the support portion of the hinge pin support bracket comprises a hinge pin bore, wherein a portion of the hinge pin is located in the hinge pin bore such that movement of the hinge pin relative to the support portion of the hinge pin support bracket is restricted.

12. A hinge assembly according to claim 10, wherein the base portion of the hinge pin support bracket extends between a shoe stop end and a hinge pin end, wherein the access aperture is located closer to the hinge pin end than the shoe stop end, and wherein the shoe stop end is configured to prevent movement of the shoe past the shoe stop end towards the hinge pin.

13. A hinge assembly according to claim 10, wherein the hinge pin support bracket is secured relative to the base by a mechanical fastener.

14. A method of protecting a hinge pin of a window hinge assembly, the method comprising:

attaching a base of a track assembly to a window frame, the track assembly comprising a shoe track, wherein the base extends along a track axis from a hinge pin end to a shoe track end, and wherein the shoe track extends along the track axis, and wherein the shoe track extends from the shoe track end towards the hinge pin end, attaching a base end of a hinge pin to the base proximate the hinge pin end of the base, the hinge pin comprising an upper end distal from the base;

engaging a shoe engaged with the shoe track, wherein the shoe is configured to slide along the shoe track end the shoe is restrained from moving transverse to the track axis when the shoe is slidably engaged with the shoe track;

attaching a sash arm to a rotating sash that is attached to the window frame, the sash arm extending from a shoe end to a distal end, wherein the shoe end is pivotally coupled to the shoe;

pivotally connecting a sash end of a connecting arm to the sash arm at an intermediate location spaced from the shoe end of the sash arm and pivotally connecting a hinge pin end of the connecting arm to the hinge pin, wherein the connecting arm rotates about a pin axis extending through the base end and the upper end of the hinge pin when the shoe moves along the shoe track and the sash arm is connected to the connecting arm; and restraining the upper end of the hinge pin above the base of the track assembly from movement relative to the base by locating the upper end of the hinge pin in a hinge pin bore located in a support portion of a hinge pin support attached to the base, wherein the support portion extends above the base, wherein pivotally connecting the connecting arm to the hinge pin comprises positioning the hinge pin in an opening in the connecting arm proximate the hinge pin end of connecting arm such that the hinge pin end of the connecting arm is located between the support portion of the hinge pin support and the base of the track assembly.

15. A method according to claim 14, wherein the hinge pin support comprises a hinge pin support bracket separate and discrete from the base of the track assembly, wherein the method comprises attaching the hinge pin support bracket to the base.

* * * * *